(12) United States Patent
Lee et al.

(10) Patent No.: US 11,654,386 B2
(45) Date of Patent: May 23, 2023

(54) ELECTROSTATIC PRECIPITATING APPARATUS AND AIR CONDITIONING SYSTEM HAVING SAME

(71) Applicant: DOOSAN ENERBILITY CO., LTD., Changwon-si (KR)

(72) Inventors: Jin Woon Lee, Gimhae-si (KR); Sang Rin Lee, Changwon-si (KR); Jae Dong Hwang, Gunsan-si (KR); Sang Chul Moon, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 320 days.

(21) Appl. No.: 16/856,004

(22) Filed: Apr. 22, 2020

(65) Prior Publication Data
US 2020/0360936 A1    Nov. 19, 2020

(30) Foreign Application Priority Data

May 14, 2019    (KR) .................... 10-2019-0056574
Jul. 1, 2019    (KR) .................... 10-2019-0078766
Jul. 3, 2019    (KR) .................... 10-2019-0080219

(51) Int. Cl.
*B03C 3/78* (2006.01)
*F24F 3/16* (2021.01)
(Continued)

(52) U.S. Cl.
CPC .......... *B01D 46/12* (2013.01); *B01D 46/0032* (2013.01); *B01D 46/681* (2022.01);
(Continued)

(58) Field of Classification Search
CPC combination set(s) only.
See application file for complete search history.

(56) References Cited

U.S. PATENT DOCUMENTS 2,500,572 A  *  3/1950  Richardson ............... B03C 3/38
                                               96/88
3,673,768 A  *  7/1972  Leonard .................... B03C 3/82
                                               96/74
(Continued)

FOREIGN PATENT DOCUMENTS

CN        201187845 Y      1/2009
CN        104129837 A     11/2014
(Continued)

*Primary Examiner* — Christopher P Jones
*Assistant Examiner* — Sonji Turner
(74) *Attorney, Agent, or Firm* — Harvest IP Law LLP

(57) ABSTRACT

An electrostatic precipitating apparatus for an air conditioning system is disclosed. The precipitating apparatus includes an electrostatic precipitator including a plurality of discharge electrodes to which a voltage is applied and a plurality of electrostatic precipitating electrodes each disposed between the discharge electrodes and grounded, a washing water supply spraying the washing water to the electrostatic precipitator, and a frame assembly fixed to the duct to support the electrostatic precipitator. The frame assembly is fixed to the duct to support the electrostatic precipitator, and includes a prestressing locking member fixed to inside of the duct in a state in which a pressing force is applied to the electrostatic precipitator.

13 Claims, 22 Drawing Sheets

(51) Int. Cl.

| | |
|---|---|
| *B03C 3/011* | (2006.01) |
| *B03C 3/019* | (2006.01) |
| *B03C 3/41* | (2006.01) |
| *B03C 3/47* | (2006.01) |
| *B03C 3/08* | (2006.01) |
| *B01D 53/04* | (2006.01) |
| *B01D 46/00* | (2022.01) |
| *B01D 46/12* | (2022.01) |
| *F24F 8/192* | (2021.01) |
| *F24F 8/158* | (2021.01) |
| *F24F 8/90* | (2021.01) |
| *B01D 46/681* | (2022.01) |
| *F24F 110/64* | (2018.01) |
| *B01D 53/00* | (2006.01) |
| *B01D 53/86* | (2006.01) |
| *F24F 8/108* | (2021.01) |

(52) U.S. Cl.
CPC .............. *B01D 53/04* (2013.01); *B03C 3/011* (2013.01); *B03C 3/019* (2013.01); *B03C 3/08* (2013.01); *B03C 3/41* (2013.01); *B03C 3/47* (2013.01); *B03C 3/78* (2013.01); *F24F 8/158* (2021.01); *F24F 8/192* (2021.01); *F24F 8/90* (2021.01); *B01D 53/007* (2013.01); *B01D 53/8675* (2013.01); *B01D 2253/102* (2013.01); *B01D 2255/802* (2013.01); *B01D 2257/106* (2013.01); *B01D 2259/4508* (2013.01); *B01D 2259/804* (2013.01); *B01D 2279/50* (2013.01); *F24F 8/108* (2021.01); *F24F 2110/64* (2018.01)

(56) References Cited

U.S. PATENT DOCUMENTS

| | | | | |
|---|---|---|---|---|
| 3,831,351 | A | * | 8/1974 | Gibbs ...................... B03C 3/60 |
| | | | | 29/505 |
| 4,138,232 | A | | 2/1979 | Winkler et al. |
| 4,152,124 | A | | 5/1979 | Davis |
| 4,233,039 | A | | 11/1980 | Schmidt |
| 4,294,591 | A | * | 10/1981 | Kahl ........................ B03C 3/70 |
| | | | | 96/88 |
| 4,700,014 | A | * | 10/1987 | Joy ........................ H01B 17/52 |
| | | | | 174/31 R |
| 10,071,384 | B2 | * | 9/2018 | Kojima ..................... B03C 3/78 |

FOREIGN PATENT DOCUMENTS

| | | | | |
|---|---|---|---|---|
| JP | 1993-261315 | A | | 10/1993 |
| JP | H08-49989 | A | | 2/1996 |
| JP | 11276927 | A | * | 10/1999 |
| JP | 2000-107637 | A1 | | 4/2000 |
| JP | 2000107637 | A | * | 4/2000 |
| JP | 2009-034599 | A | | 2/2009 |
| JP | 2009-095799 | A1 | | 5/2009 |
| JP | 2010063966 | A | * | 3/2010 |
| JP | 2012205974 | A | | 10/2012 |
| JP | 2013-212455 | A | | 10/2013 |
| JP | 2015-016405 | A | | 1/2015 |
| JP | 2016-209791 | A1 | | 12/2016 |
| KR | 100688945 | B1 | | 3/2007 |
| KR | 100767573 | B1 | | 10/2007 |
| KR | 100769285 | B1 | | 10/2007 |
| KR | 10-2010-0091734 | A | | 8/2010 |
| KR | 101554193 | B1 | | 9/2015 |
| KR | 10-1610240 | B1 | | 4/2016 |
| KR | 101622238 | B1 | | 5/2016 |
| KR | 10-2017-0039788 | A | | 4/2017 |
| KR | 10-2017-0076944 | A | | 7/2017 |
| KR | 101949984 | B1 | | 4/2019 |

* cited by examiner

ELECTROSTATIC PRECIPITATING APPARATUS AND AIR CONDITIONING SYSTEM HAVING SAME

CROSS REFERENCE TO RELATED APPLICATION

The present application claims priority to Korean Patent Application No. 10-2019-0056574, 10-2019-0078766, and 10-2019-0080219 filed on May 14, 2019, Jul. 1, 2019 and Jul. 3, 2019 respectively, the entire contents of which are incorporated herein for all purposes by this reference.

FIELD

The present disclosure relates to an electrostatic precipitating apparatus for precipitating dust and an air conditioning system having the same.

BACKGROUND

Generally, the installation of air filtration devices is continuously increasing in order to create comfortable indoor air in living spaces and to protect human health. In recent years, it has become almost essential to provide not only an air conditioning function but also an air purifying function to an air conditioner installed in a building or an underground facility. However, contaminated dust in human living spaces and office spaces has various sizes ranging from a few sub-microns to tens of microns, and also has very different chemical or microbiological characteristics. Therefore, depending on the chemical or microbiological characteristics of this contaminated dust, the harmful effects of the contaminated dust on the human body may vary.

For this purpose, an air conditioning system for temperature control and air purification of the entire building is widely used. The air conditioning system generates cold or warm air and supplies the air to the room using ducts.

The air conditioning system is equipped with a pre-filter for collecting coarse particles, and an activated carbon filter and a HEPA filter for collecting fine particles in order to perform a function of purifying air. However, when fine filters having such a structure are applied, there is a problem that the pressure loss is increased and air blowing efficiency is lowered.

BRIEF DESCRIPTION

An objective of the present disclosure is to provide an electrostatic precipitating apparatus capable of efficiently removing fine dust while minimizing pressure loss and an air conditioning system having the same on the basis of the technical background as described above.

In an aspect of the present disclosure, there is provided an electrostatic precipitating apparatus for an air conditioning system, the electrostatic precipitating apparatus including: an electrostatic precipitator including a plurality of discharge electrodes to which a voltage is applied and a plurality of electrostatic precipitating electrodes each disposed between the discharge electrodes and grounded; a washing water supply spraying the washing water to the electrostatic precipitator; and a frame assembly fixed to the duct to support the electrostatic precipitator, the frame assembly including a prestressing locking member fixed to the inside of the duct in a state in which a pressing force is applied to the electrostatic precipitator.

The prestressing locking member may include a casing, an insulator disposed in the casing, a pressing rod coupled to the insulator so as to protrude downward, and a pressing support fixedly coupled to the pressing rod to resiliently support the electrostatic precipitator.

The electrostatic precipitator may include a plurality of first tie rods fixed to the discharge electrodes so as to pass through the electrostatic precipitating electrodes, and a plurality of second tie rods fixed to the electrostatic precipitating electrodes so as to pass through the discharge electrodes, wherein the frame assembly further includes a plurality of upper supports to which some of the first tie rods are fixed, and wherein the prestressing locking member is fixedly provided to press the upper support inward.

The electrostatic precipitating apparatus may further include a washing water treatment section disposed under the electrostatic precipitator to accommodate the washing water falling from the electrostatic precipitator, the washing water treatment section including: a water reservoir containing the washing water; an adsorption belt formed in an endless track and accommodated in the water reservoir; and a roller connected to the adsorption belt to move the adsorption belt.

The adsorption belt may be formed from a mesh material.

One side of the adsorption belt may be immersed in the washing water, and the other side of the adsorption belt may be located above the washing water.

The washing water treatment section may further include a scraper configured to scrape off dust attached to the adsorption belt and separate the dust from the adsorption belt.

The scraper may include a support part installed upright from the bottom of the water reservoir, and an elastic tip part protruding upward from the support part.

The scraper may include a rotatable rotary rod and a plurality of paddles circumferentially spaced apart from each other so as to protrude from an outer circumferential surface of the rotary rod.

A separation container may be disposed in a space defined by a blocking member below the scraper.

A bottom surface of the electrostatic precipitating electrode may be provided with a lowest portion disposed below the other portion so that the washing water is collected at the lowest portion, wherein a discharge guide having a channel is disposed directly below the lowest portion so that the washing water flowing down from the electrostatic precipitating electrode is accommodated in the channel, the discharge guide extending in the stacking direction of the electrostatic precipitating electrodes.

A lower part of the electrostatic precipitating electrode may be provided with a fixing hole, through which a fixing rod is inserted, wherein a support hanger is coupled to the fixing rod to support the discharge guide.

The support hanger may include a lower support bar extending in the stacking direction of the electrostatic precipitating electrodes so as to be fixed to the discharge guide, and a plurality of connection protrusions protruding upward from the lower support bar and into which the lower part of the electrostatic precipitating electrode is inserted, wherein the connection protrusion is provided with a support hole into which the fixing rod is inserted.

In another aspect, there is provided an air conditioning system including: a duct having a gas inlet and a gas outlet: a pre-filter disposed adjacent to the gas inlet; an electrostatic precipitator disposed on a rear side of the pre-filter and including a plurality of discharge electrodes to which a voltage is applied and a plurality of electrostatic precipitating electrodes each disposed between the discharge electrodes and grounded; a washing water supply spraying the washing water to the electrostatic precipitator; and a frame assembly fixed to the duct to support the electrostatic precipitator, the frame assembly including a prestressing locking member fixed to the inside of the duct in a state in which a pressing force is applied to the electrostatic precipitator.

The air conditioning system may further include a washing water treatment section disposed under the electrostatic precipitator to accommodate the washing water falling from the electrostatic precipitator, the washing water treatment section including: a water reservoir containing the washing water; an adsorption belt formed in an endless track and accommodated in the water reservoir; a roller connected to the adsorption belt to move the adsorption belt; and a scraper configured to scrape off dust attached to the adsorption belt and separate the dust from the adsorption belt.

The adsorption belt may be formed from a mesh material.

One side of the adsorption belt may be immersed in the washing water, and the other side of the adsorption belt may be located above the washing water.

The scraper may include a support part installed upright from the bottom of the water reservoir, and an elastic tip part protruding upward from the support part.

A carbon filter may be disposed on a rear side of the electrostatic precipitator, wherein the carbon filter contains activated carbon.

In a further aspect, there is provided an air conditioning system including: a duct having a gas inlet and a gas outlet: a pre-filter disposed adjacent to the gas inlet; an electrostatic precipitator disposed on a rear side of the pre-filter and including a plurality of discharge electrodes to which a voltage is applied and a plurality of electrostatic precipitating electrodes each disposed between the discharge electrodes and grounded; a washing water supply spraying the washing water to the electrostatic precipitator; and a frame assembly having an upper support supporting the discharge electrodes, the frame assembly further including a prestressing locking member fixed to the inside of the duct to press the upper support so that the electrostatic precipitator is insulated in the duct.

As described above, according to an embodiment of the present disclosure, since the electrostatic precipitating apparatus is installed inside the air conditioning system, dust contained in the air may be efficiently removed while minimizing the differential pressure. In addition, since the electrostatic precipitating apparatus is resiliently installed by the prestressing locking member, vibration of the electrostatic precipitating apparatus may be efficiently reduced.

DETAILED DESCRIPTION

Figure 1:
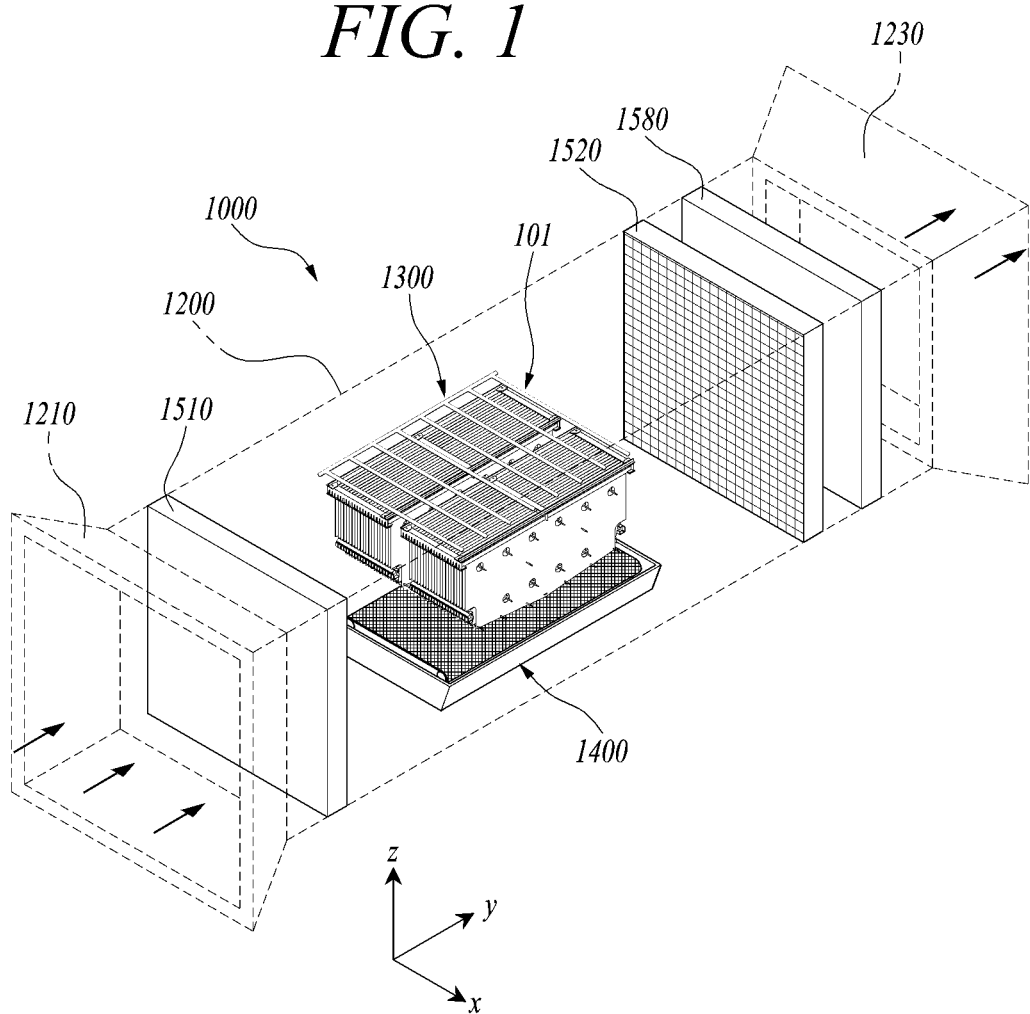
FIG. 1 is a view illustrating an air conditioning system according to a first embodiment of the present disclosure.

As the present disclosure allows for various changes and numerous embodiments, particular embodiments will be illustrated and described in detail in the detailed description. However, it should be understood that this is not intended to limit the present disclosure to the specific embodiments, but may include all transformations, equivalents, and substitutes included in the spirit and scope of the present disclosure.

The terminology used herein is for the purpose of describing particular embodiments only and is not intended to be limiting the present disclosure. Singular expressions include plural expressions unless the context clearly indicates otherwise. It will be further understood that the terms "comprises" and/or "comprising," or "includes" and/or "including," when used in this specification, specify the presence of stated features, numbers, steps, operations, elements, components, or a combination thereof, but do not preclude the presence or addition of one or more other features, numbers, steps, operations, elements, components, or a combination thereof.

Reference will now be made in greater detail to a preferred embodiment of the present disclosure, an example of which is illustrated in the accompanying drawings. Wherever possible, the same reference numerals will be used throughout the drawings and the description to refer to the same or like parts. In the following description, it is to be noted that, when the functions of conventional elements and the detailed description of elements related with the present disclosure may make the gist of the present disclosure unclear, a detailed description of those elements will be omitted. Similarly, some elements shown in the drawings may be exaggeratedly or schematically drawn or omitted to make the present disclosure easy to understand.

Hereinbelow, an air conditioning system according to a first embodiment will be described.

Figure 2:
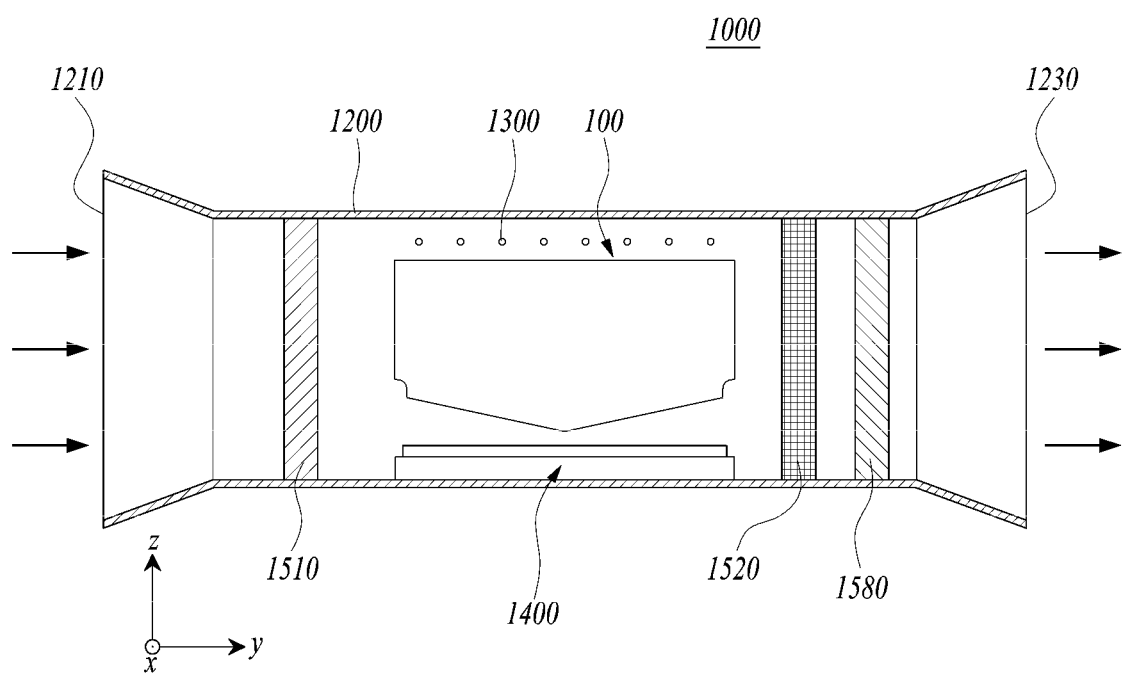
FIG. 2 is a longitudinal cross-sectional view of the air conditioning system according to the first embodiment.

FIG. 1 is a view illustrating an air conditioning system 1000 according to the first embodiment of the present disclosure, and FIG. 2 is a longitudinal cross-sectional view of the air conditioning system 1000 according to the first embodiment.

Referring to FIGS. 1 and 2, the air conditioning system 1000 according to the first embodiment is an apparatus that introduces and heats/cools external air or indoor circulation air, and removes dust contained in the air.

The air conditioning system 1000 includes a duct 1200, a pre-filter 1510, and a precipitating apparatus 101 for precipitating dust. The duct 1200 is formed from a substantially rectangular tube, and a blower (not shown) may be installed at one side or both sides in the longitudinal direction (y-axis direction) of the duct 1200. An air inlet 1210 may be formed on one side of the duct 1200 and an air outlet 1230 may be formed on the other side of the duct 1200 in the longitudinal direction.

The pre-filter 1510 is a filter that collects large dust, such as suspended matter and the like, having a size of 150 μm or more. The pre-filter 1510 is installed in front of an electrostatic precipitator 100 with respect to the movement direction (y-axis direction) of air to absorb large dust to be introduced into the electrostatic precipitator 100. The pre-filter 1510 may include a nonwoven fabric and a known metal mesh disposed on opposite sides of the nonwoven fabric. However, the present disclosure is not limited thereto, and the pre-filter 1510 may be formed of various kinds of materials.

The air conditioning system 1000 further includes a carbon filter 1520 in which activated carbon having high adsorptivity is contained. Activated carbon is a porous material that has a characteristic of adsorbing pigments and odors well. Therefore, the carbon filter 1520 physically adsorbs and removes various kinds of harmful gases and odors. The carbon filter 1520 is located at the rear of the electrostatic precipitator 100 with respect to the traveling direction of air so as to not only adsorb odors from the air discharged from the electrostatic precipitator 100, but also remove ozone generated by the electrostatic precipitator 100. Although ozone may remove bacteria in the air due to its strong bactericidal action, a large amount of ozone is harmful to human body so it should be removed. In the first embodiment in which the carbon filter 1520 is disposed behind the electrostatic precipitator 100, ozone generated in the electrostatic precipitator 100 may be efficiently removed.

The air conditioning system 1000 further includes a heat exchanger 1580 that may have a structure to be adapted to the air conditioning system to heat or cool air. While the heat exchanger 1580 may be disposed at the rear of the carbon filter 1520, the present disclosure is not limited thereto, so the heat exchanger 1580 may be disposed in front of the pre-filter 1510 or between the electrostatic precipitator 100 and the carbon filter 1520.

The electrostatic precipitator 100 is disposed between the pre-filter 1510 and the carbon filter 1520. A washing water supply 1300 is disposed above the electrostatic precipitator 100. The washing water supply 1300 supplies washing water to the electrostatic precipitator 100 to remove dust attached to an electrostatic precipitating electrode 13.

Figure 3:
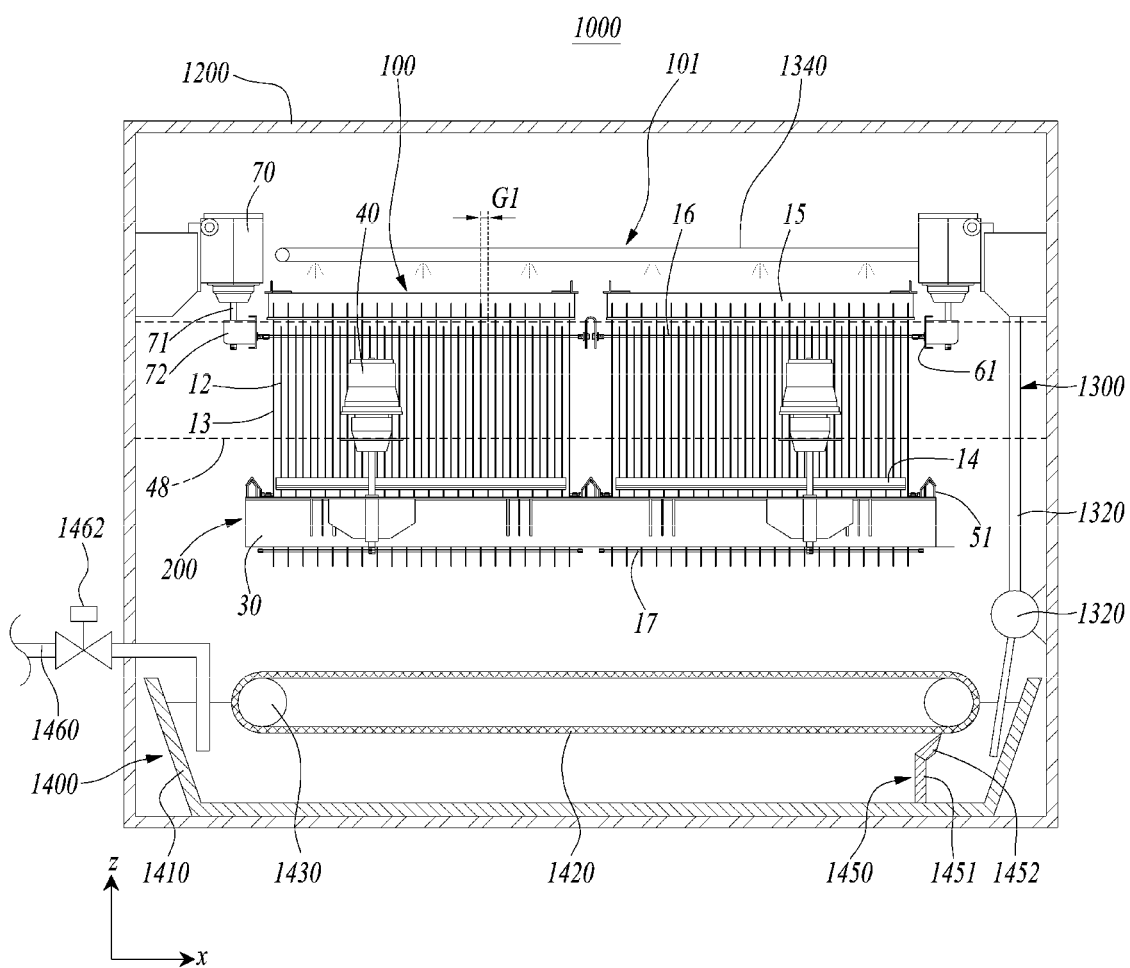
FIG. 3 is a horizontal cross-sectional view of the air conditioning system according to the first embodiment.
Figure 4:
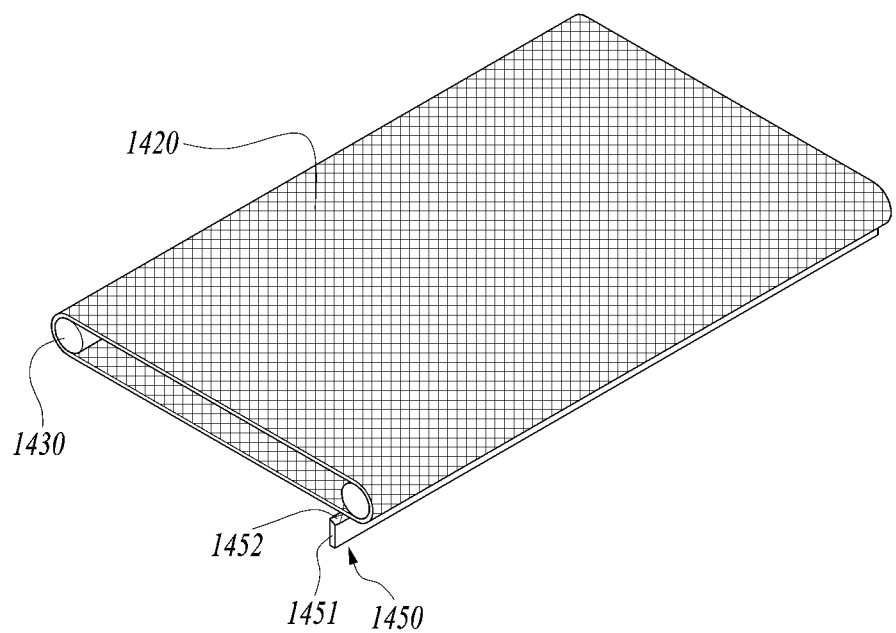
FIG. 4 is a perspective view illustrating an adsorption belt and a roller of the air conditioning system according to the first embodiment.

FIG. 3 is a horizontal cross-sectional view of the air conditioning system according to the first embodiment, and FIG. 4 is a perspective view illustrating an adsorption belt and a roller of the air conditioning system according to the first embodiment.

Referring to FIGS. 3 and 4, the precipitating apparatus 101 includes an electrostatic precipitator 100, a frame assembly 200, a washing water supply 1300, and a washing water treatment section 1400. The precipitating apparatus 101 is an electrostatic precipitating apparatus that electrostatically precipitates dust and removes the precipitated dust using washing water.

The washing water supply 1300 includes a washing water supply line 1310, a pump 1320, and a spray line 1340. The washing water supply line 1310 is a pipe that extends from the inside of a water reservoir 1410, disposed at the bottom of the inside of the duct 1200, to the upper part of the inside of the duct. The pump 1320 is connected to the washing water supply line 1310 to supply the washing water. The spray line 1340 is disposed above the electrostatic precipitator 100 so as to spray the washing water toward the electrostatic precipitator 100. A nozzle may be attached to the spray line 1340, and the spray line 1340 may extend in the stacking direction of the discharge electrodes 12 and the electrostatic precipitating electrodes 13. The washing water supply 1300 may operate intermittently, for example, for a few minutes every few hours. When the washing water is supplied, no voltage is applied to the discharge electrodes 12.

The washing water treatment section 1400 serves to accommodate the washing water falling from the electrostatic precipitator 100 and solidify the dust contained in the washing water. The washing water treatment section 1400 includes a water reservoir 1410 for storing the washing water, an adsorption belt 1420 disposed above the water reservoir 1410, a roller 1430 moving the adsorption belt 1420, and a scraper 1450 removing the dust attached to the adsorption belt 1420. Here, the washing water may be water, or a sodium hydroxide solution. When the sodium hydroxide solution is used as the washing water, the washing power can be improved.

The water reservoir 1410 is disposed at the bottom of the duct 1200 and stores the washing water supplied through the washing water supply 1300. A refill line 1460 may be connected to the water reservoir 1410 to refill water, and a valve 1462 may be attached to the refill line 1460.

The adsorption belt 1420 may be formed from a metallic or resinous mesh material having a plurality of holes. When the adsorption belt 1420 is formed from a mesh material, dust contained in the washing water is attached to the adsorption belt 1420 while falling to the water reservoir through the adsorption belt 1420.

The adsorption belt 1420 is formed in an endless track form by connecting the longitudinal ends together. The lower part of the adsorption belt 1420 is immersed in the washing water, and the upper part of the adsorption belt 1420 is located above the washing water so as to be exposed to outside. That is, in the adsorption belt 1420 having a flat annular longitudinal section, the lower part may be immersed in the washing water and the upper part may be located above the washing water with respect to the central portion in the vertical or height direction. The adsorption belt 1420 has an upper flat surface, a lower flat surface, and curved side surfaces connecting the upper and lower surfaces, wherein the lower flat surface is located in the washing water and the upper flat surface is located above the washing water.

During the movement, the lower surface of the adsorption belt 1420 adsorbs dust in the washing water contained in the water reservoir and the upper surface of the adsorption belt 1420 adsorbs dust in the washing water falling thereto.

Two rollers 1430 support the adsorption belt 1420 at opposite longitudinal ends of the adsorption belt 1420. A motor is connected to the roller 1430 to rotate the roller 1430 and the adsorption belt 1420 connected to the roller. The roller 1430 may be operated intermittently only while the washing water is supplied.

The scraper 1450 is disposed under the adsorption belt 1420 such that the scraper 1450 contacts the lower surface of the adsorption belt 1420 to scrape off and remove the dust attached to the adsorption belt 1420. The scraper 1450 includes a support part 1451 and a tip part 1452 fixed to an upper portion of the support part 1451. The support part 1451 is fixedly erected from the bottom of the water reservoir 1410. The tip part 1452 extends upwards in an inclined manner with respect to the support part 1451. The tip part may be formed of an elastic material. The dust mass separated by the scraper 1450 solidifies and accumulates at the bottom of the water reservoir 1410 so that the upper part of the inside of the water reservoir 1410 is provided with relatively clean washing water. The relatively clean washing water may be supplied to the washing water supply 1300 for further washing.

Accordingly, according to the first embodiment, the washing water stored in the water reservoir 1410 may be used for a predetermined period without being discharged. In addition, when the washing water needs to be replaced, the washing water may be replaced after the dust mass on the bottom of the water reservoir 1410 is removed.

As described above, according to the first embodiment, the dust sinks to the bottom of the water reservoir 1410 so that the washing water may be purified, thereby increasing the service life of the washing water.

Figure 5:
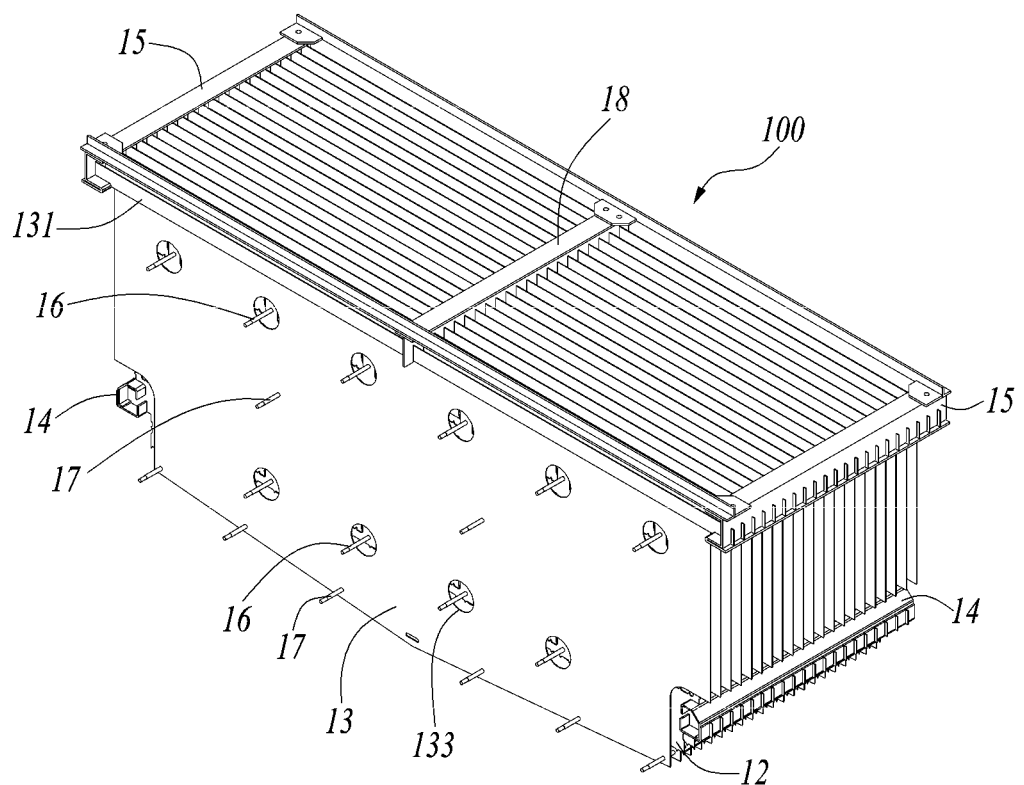
FIG. 5 is a perspective view illustrating an electrostatic precipitating apparatus of the air conditioning system according to the first embodiment.
Figure 6:
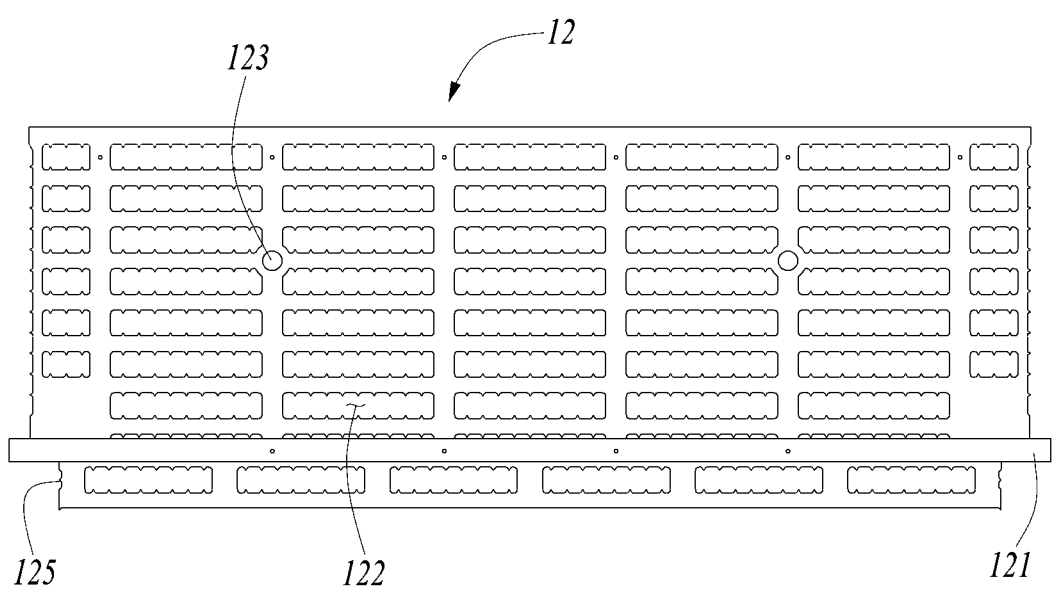
FIG. 6 is a front view illustrating a discharge electrode of the electrostatic precipitating apparatus according to the first embodiment.
Figure 7:
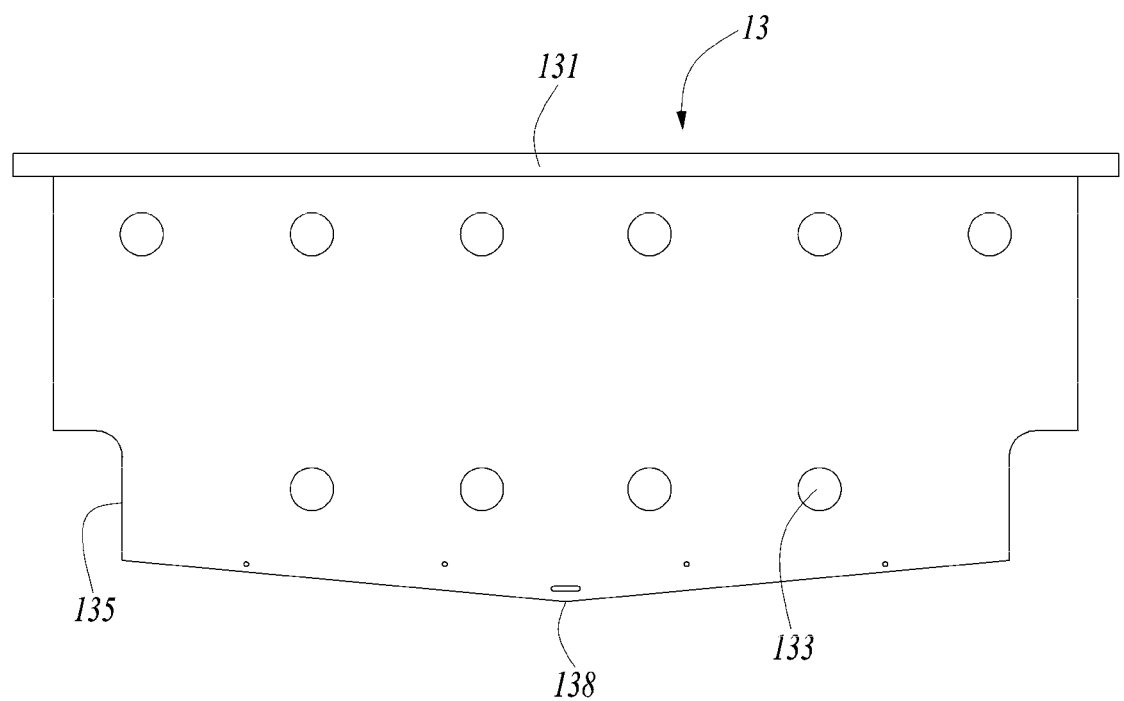
FIG. 7 is a front view illustrating an electrostatic precipitating electrode of the electrostatic precipitating apparatus according to the first embodiment.

FIG. 5 is a perspective view illustrating an electrostatic precipitating apparatus of the air conditioning system according to the first embodiment, FIG. 6 is a front view illustrating a discharge electrode of the electrostatic precipitating apparatus according to the first embodiment, and FIG. 7 is a front view illustrating a electrostatic precipitating electrode of the electrostatic precipitating apparatus according to the first embodiment.

Referring to FIGS. 5 to 7, the electrostatic precipitator 100 includes discharge electrodes 12, electrostatic precipitating electrodes 13, first tie rods 16, second tie rods 17, first setting beams 14, second setting beams 15, and central setting beams 18. The electrostatic precipitator 100 may be installed inside the duct 1200 by means of the frame assembly 200 in a state of being fixed by the tie rods 16 and 17 and the setting beams 14, 15 and 18. The frame assembly 200 is fixed to the inner wall of the duct 1200 to support the electrostatic precipitator 100.

The discharge electrode 12 has a flat panel shape having a plurality of rectangular openings 122 with a plurality of discharge fins formed at an edge portion thereof. The discharge fins may be of a needle shape, and may be spaced apart from each other along the outer edge and openings 122 of the discharge electrode 12.

The discharge electrode 12 includes a first reinforcing rod 121 installed at a lower portion of the discharge electrode, wherein the first reinforcing rod 121 is coupled to the first setting beam 14 to support the discharge electrode 12. The first reinforcing rod 121 extends longer than the width of the discharge electrode 12 so as to protrude beyond both sides of the discharge electrode 12. In addition, the discharge electrode 12 may be provided with a plurality of first holes 123 through which the second tie rods 17 pass.

In addition, cutout grooves 125 for installing the first setting beams 14 are formed in both lower portions of the discharge electrode 12. The upper portions of the cutout groove 125 and the first reinforcing rod 121 are fixedly inserted together into the first setting beam 14.

The electrostatic precipitating electrode 13 is of a flat panel shape having a plurality of second holes 133 through which the first tie rods 16 pass. A second reinforcing rod 131 is disposed on the electrostatic precipitating electrode 13 to support the electrostatic precipitating electrode 13. The second reinforcing rod 131 extends longer than the width of the electrostatic precipitating electrode 13 so as to protrude beyond from both sides of the electrostatic precipitating electrode 13.

The plurality of discharge electrodes 12 and the precipitating electrodes 13 are arranged parallel with each other such that the discharge electrodes 12 are respectively disposed at regular intervals between the precipitating electrodes 13. The gap G1 between the electrostatic precipitating electrode 13 and the discharge electrode 12 may range from 50 mm to 70 mm in size.

Cutout grooves 135 are formed at both lower sides of the electrostatic precipitating electrode 13, and the first setting beam 14 is provided to pass through the cutout grooves 135. An upper end of the cutout groove 135 may be formed above the first reinforcing rod to prevent the electrostatic precipitating electrode 13 from being short-circuited with the discharge electrode 12.

A high voltage is applied to the discharge electrode 12, whereby a corona discharge is generated between the discharge electrode 12 and the electrostatic precipitating electrode 13 to create an electrostatic force. During the movement of gases toward a region where the corona discharge and the electrostatic force are generated, a particulate material is charged by ions (e.g., electrons) generated by the corona discharge, and the charged particulate material is attached to the electrostatic precipitating electrode 13 with the electrostatic force. In addition, ozone generated by the corona discharge can remove bacteria contained in the air.

On the other hand, a lower end 134 of the electrostatic precipitating electrode 13 may be formed to be inclined with respect to the ground such that the inclined portion is provided with a lowest part 138. The lowest part 138 may be the center or one side of the lower end of the electrostatic precipitating electrode 13 in the width direction.

The lower end of the electrostatic precipitating electrode 13 is formed to be inclined downward with respect to the ground from both sides toward the center in the width direction. Accordingly, the central portion of the electrostatic precipitating electrode 13 is located below the both sides, so that the washing water flowing along the surface of the electrostatic precipitating electrode 13 is collected at the lowest central part 138 along the lower end of the electrostatic precipitating electrode 13.

The first tie rods 16 are inserted and fitted into the plurality of discharge electrodes 12 through the second holes 133 formed in the electrostatic precipitating electrodes 13 without contact with the electrostatic precipitating electrodes 13. The plurality of first tie rods 16 are installed at the upper and lower portions of the discharge electrodes 12.

Each of the first tie rods 16 has a threaded end portion. The first tie rod 16 disposed on the lower side is fixed to a lower support 51, and the first tie rod 16 disposed on the upper side is fixed to an upper support 61.

Meanwhile, the second tie rods 17 are inserted and fitted into the plurality of electrostatic precipitating electrodes 13 through the first holes 123 formed in the discharge electrodes 12 without contact with the discharge electrodes 12.

The second tie rods 17 may be coupled to the upper and lower portions of the electrostatic precipitating electrodes 13, respectively, such that the end portions of the second tie rods 17 are fixed to the electrostatic precipitating electrodes 13. However, the present disclosure is not limited thereto, and the second tie rods 17 may be fixed to other members in the duct 1200.

Spacers may be provided on the first tie rods 16 and the second tie rods 17 to maintain a gap between the discharge electrodes 12 and the electrostatic precipitating electrodes 13. A spacer provided on the discharge electrode 12 penetrates through the second hole 133 such that the longitudinal end thereof is in contact with the surface of the discharge electrode 12, and the spacer provided on the electrostatic precipitating electrode 13 penetrates through the first hole 123 such that the longitudinal end thereof is in contact with the surface of the electrostatic precipitating electrode 13.

Figure 8:
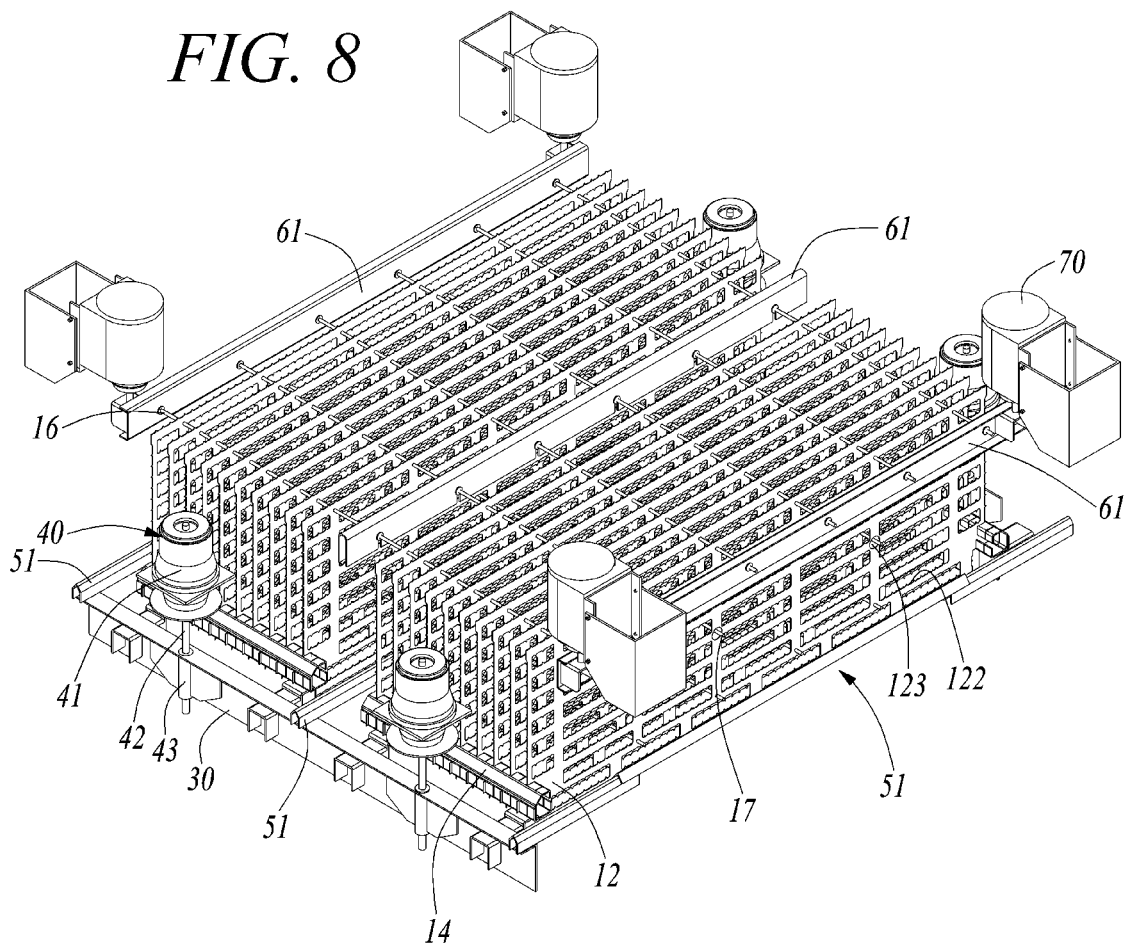
FIG. 8 is a perspective view illustrating a discharge electrode, and a frame assembly in the electrostatic precipitating apparatus according to the first embodiment.
Figure 9:
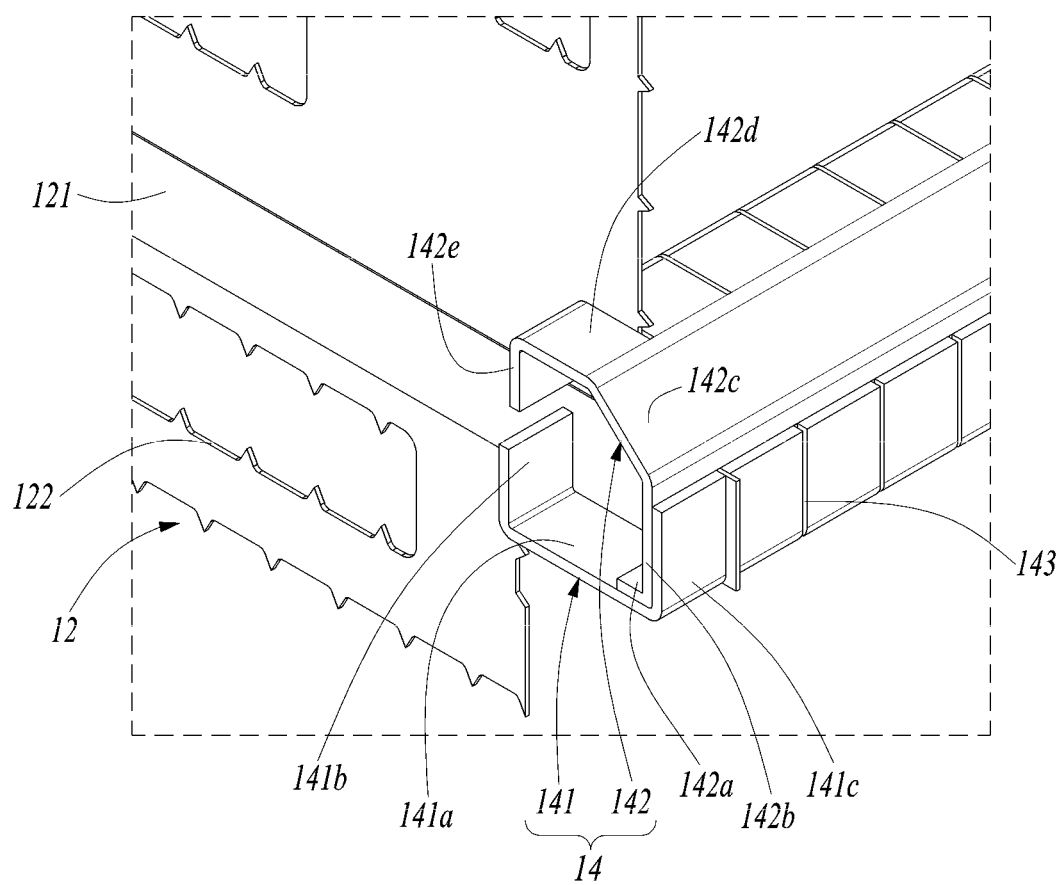
FIG. 9 is a view illustrating a state in which the discharge electrode is supported by a first setting beam of the electrostatic precipitating apparatus according to the first embodiment.
Figure 10:
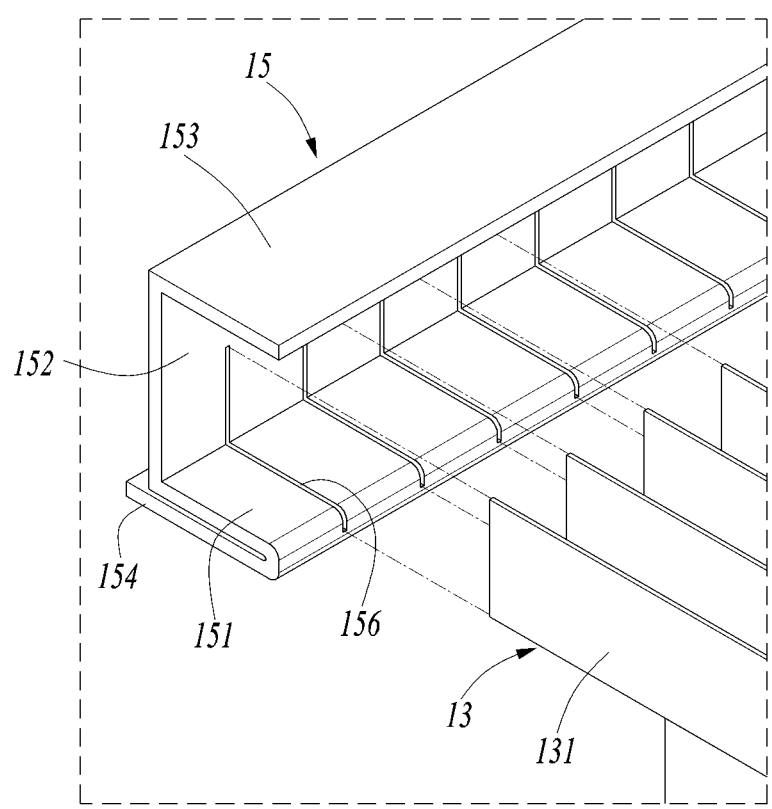
FIG. 10 is a view illustrating a state in which the electrostatic precipitating electrode is supported by a second setting beam of the electrostatic precipitating apparatus according to the first embodiment.

FIG. 8 is a perspective view illustrating the discharge electrode 12, and a frame assembly in the electrostatic precipitating apparatus according to the first embodiment, FIG. 9 is a view illustrating a state in which the discharge electrode is supported by the first setting beam 14 of the electrostatic precipitating apparatus according to the first embodiment. FIG. 10 is a view illustrating a state in which the electrostatic precipitating electrode is supported by a second setting beam of the electrostatic precipitating apparatus according to the first embodiment.

Referring to FIGS. 8 to 10, the first setting beam 14 is formed to extend in the stacking direction of the discharge electrodes 12, and has a plurality of lower slots 143 into which a plurality of side ends of the discharge electrodes 12 are inserted. The first reinforcing rod 121 is inserted through the first setting beam 14 such that the lower end of the first reinforcing rod 121 is supported by the bottom of the first setting beam 14.

The first setting beam 14 includes a lower beam 141 and an upper beam 142 coupled to the lower beam 141. The lower beam 141 has a bottom portion 141a and two side walls 141b and 141c which are bent and protrude upwards from both side ends of the bottom portion 141a. The upper beam 142 has a lower support portion 142a contacting the bottom portion 141a, an outer support portion 142b that are bent from the lower support portion 142a so as to abut against the side wall 141c, an inclined portion 142c bent inclined from the outer support portion 142b, an upper support portion 142d bent parallel with the bottom portion 141a from the inclined portion 142c, and an inner support portion 142e bent downwards from the upper support portion 142d. Moisture existing on the first setting beam 14 can be easily discharged to the outside through the inclined portion 142c.

The lower slots 143 are formed not at the bottom portion 141a but at the side walls 141b and 141c. The lower slots 143 are also provided in the upper beam 142 at the lower support portion 142a and the outer support portion 142b. The lower slots 143 formed at the lower and upper beams 141 and 142 communicate with each other, and the first reinforcing rods 121 protrude to outside through the lower slots 143 formed in the outer sidewall 141b and the outer support portion 142b.

When the upper beam 142 and the lower beam 141 are coupled to each other, the first setting beam 14 is formed into a tubular shape with one side surface cut out. When the first setting beam 14 can be divided into the upper beam 142 and the lower beam 141, the discharge electrode 12 can be easily welded to the lower beam 141. That is, in a state in which the discharge electrode 12 is welded to the lower beam 141, when the upper beam 142 is coupled to the lower beam 141 and the discharge electrode 12 is welded to the upper beam 142, the discharge electrode 12 can be stably fixed to the first setting beam 14 with the first setting beam 14 formed into a tubular form.

The first reinforcing rod 121 may be made of the same material as the first setting beam 14, and may be thicker than the discharge electrode 12. Thus, the first reinforcing rod 121 may be easily welded to the first setting beam 14. The discharge electrode 12 should have a minimal thickness and excellent electric conductivity. However, if the discharge electrode 12 has high conductivity and a small thickness, welding may be difficult. As described above, according to the first embodiment, since the discharge electrode 12 includes the first reinforcing rod 121, the discharge electrode 12 can be easily welded to the first setting beam 14.

The second setting beam 15 is formed to extend in the stacking direction of the electrostatic precipitating electrodes 13, and has a plurality of upper slots 156 into which the side ends of the electrostatic precipitating electrodes 13 are inserted. The upper slots 156 may be spaced along a longitudinal direction of the second setting beam 15, and the second setting beam 15 may be located above the first setting beam 14. In the meantime, as illustrated in FIG. 2, the central setting beam 18 is formed at the center of the upper end of the electrostatic precipitating electrode 13 in the widthwise direction thereof, wherein the central setting beam 18 is formed in a T-shape, and has a plurality of slots for inserting the upper center of the electrostatic precipitating electrode 13 therethrough.

The second reinforcing rod 131 is fixed to the upper end of the electrostatic precipitating electrode 13 through the second setting beam 15. The second reinforcing rod 131 is installed to penetrate the second setting beam 15 such that a lower end of the second reinforcing rod 131 is supported by the second setting beam 15.

The second setting beam 15 includes a lower plate 151, a side plate 152 bent upward from the lower plate 151, an upper plate 153 bent opposite to the lower plate 151 from the side plate 152, and a support plate 154 disposed below and parallel with the lower plate 151. The second reinforcing rod 131 is inserted into a part of the lower plate 151 and the side plate 152 such that a lower end thereof abuts against an upper surface of the support plate 154. The second reinforcing rod 131 may be welded to the second setting beam 15.

As described above, the electrostatic precipitator 100 according to the first embodiment includes the first tie rod 16, the second tie rod 17, the first setting beam 14, and the second setting beam 15, thereby having an effect of stably fixing the discharge electrodes and the electrostatic precipitating electrodes while maintaining a distance therebetween.

Figure 11:
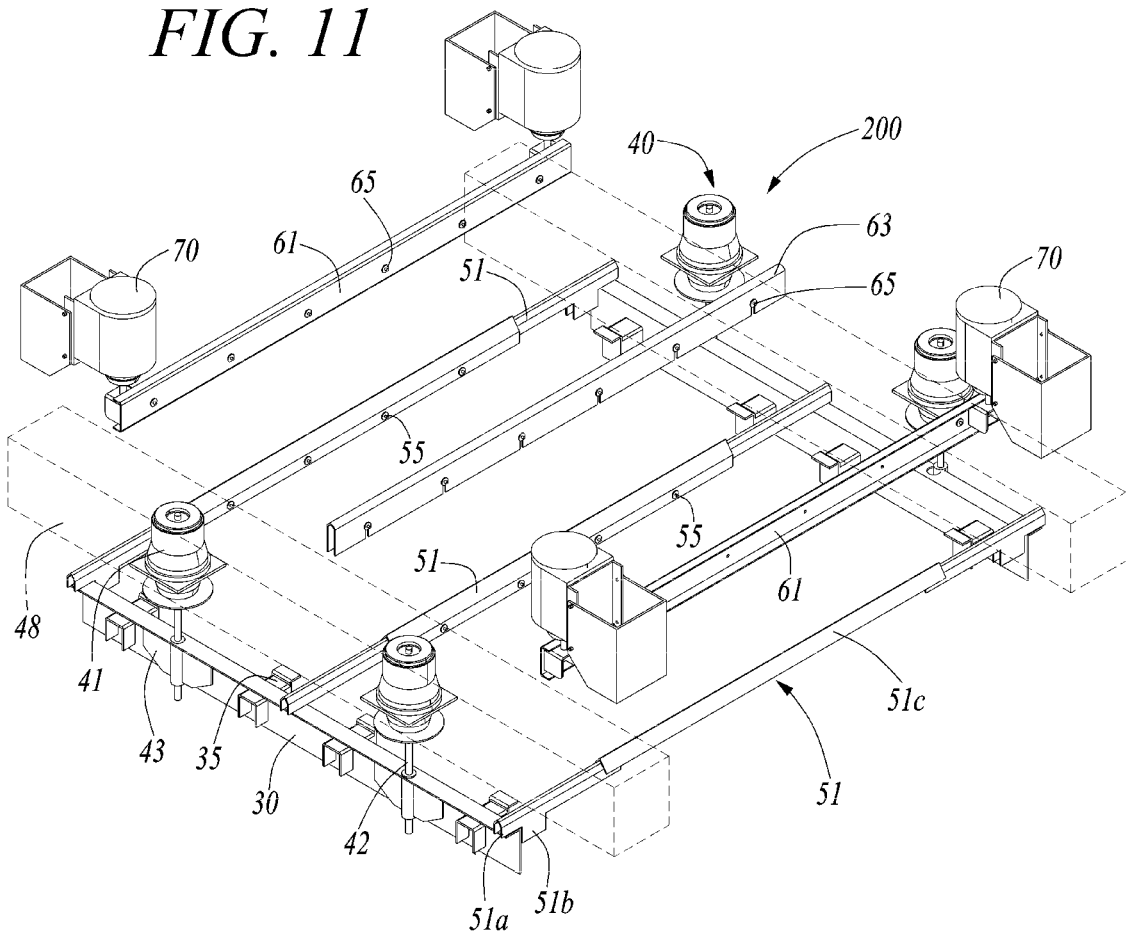
FIG. 11 is a perspective view illustrating a frame assembly of the electrostatic precipitating apparatus according to the first embodiment.
Figure 12:
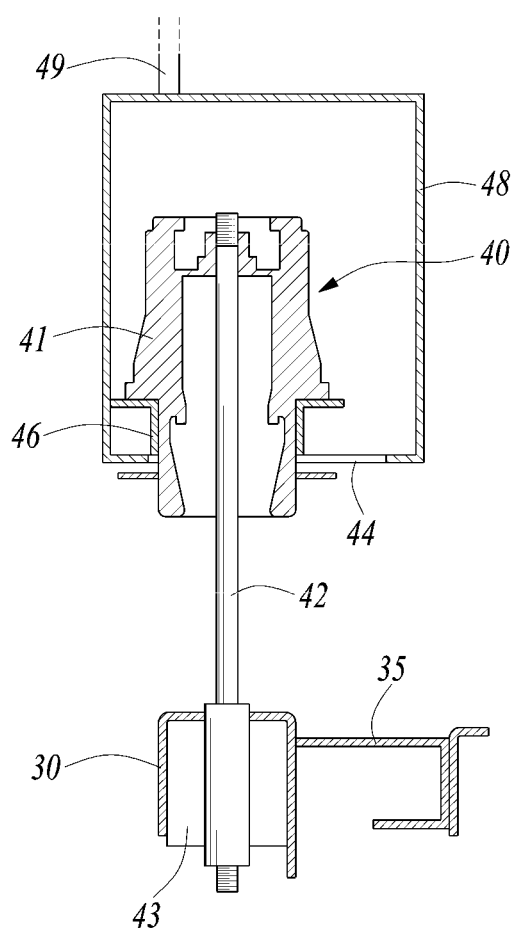
FIG. 12 is a cross-sectional view illustrating an insulating connector member and a lower frame of the electrostatic precipitating apparatus according to the first embodiment.

FIG. 11 is a perspective view illustrating a frame assembly according to the first embodiment, and FIG. 12 is a cross-sectional view illustrating an insulating connecting member and a lower frame according to the first embodiment.

Referring to FIGS. 11 and 12, the frame assembly 200 includes lower frames 30, a tubular girder 48, outer upper supports 61, lower supports 51, prestressing locking members 70, and insulating connecting members 40.

The lower frame 30 are formed to extend in the stacking direction of the discharge electrodes 12 and the electrostatic precipitating electrodes 13 and are supported by the insulating connecting members 40. Two lower frames 30 are arranged in parallel, and two insulating connecting members 40 are provided to each lower frame 30. The lower frames 30 are provided with a plurality of cradles 35 protruding towards lateral sides of the lower frames 30, and the first setting beams 14 are mounted on the cradles 35. The lower frame 30 is applied with a high voltage, and thus the first setting beam 14 and the discharge electrodes 12 are also applied with a high voltage through the lower frame 30. Here, the charging voltage of the discharge electrode 12 may range from 25,000 V to 75,000 V.

The lower supports 51 extend in the spacing direction of the lower frames 30 and thus are held on two lower frames 30 such that the lower supports 51 are disposed at the outer side and the center of the electrostatic precipitator 100, respectively. The lower support 51 includes side protrusions 51a positioned on the lower frames 30, lower protrusions 51b projecting downward to abut the side surface of the lower frame 30, and a support bar 51c to which the first tie rod 16 is fixed.

The lower support 51 is provided with a plurality of connectors 55 to which the first tie rods 16 are screw-coupled. Both longitudinal ends of the first tie rod 16 are fixed between the outer lower support 51 and the central lower support 51.

As described above, according to the first embodiment, the electrostatic precipitator 100 can be easily fixed to the frame assembly 200 by fastening the first tie rods 16 to the lower supports.

The lower frames 30 are provided with the insulating connecting members 40 each having a terminal rod 42 for applying a high voltage to the discharge electrode 12 and a lower insulator 41. A hole for injecting air downward may be formed in the lower portion of the insulating connecting member 40. The terminal rod 42 protrudes downward through the hole and is fixed to the lower frame 30. The terminal rod 42 is provided with an anchor 43 for supporting the lower frame 30.

Accordingly, a high voltage is applied to the discharge electrode 12 through the lower frames 30 and the first setting beams 14. Further, the lower frames 30 are installed in a state of being suspended from the insulating connecting members 40.

The insulating connecting member 40 is installed in the tubular girder 48 having an inner space, and the tubular girder 48 is formed to extend in the same direction as the lower frame 30. The tubular girder 48 may be fixedly installed on an inner wall of the duct 1200, and may be provided with a purge air supply pipe 49 therein. A vent hole 44 may be provided on the lower side of the tubular girder 48 to discharge purge air therethrough.

A holder 46 is provided in the tubular girder 48 to support the lower insulator 41, which is held on the holder 46. A high voltage source is connected to the insulating connecting member 40, and the terminal rod 42 is fixed to the tubular girder 48 via the lower insulator 41 for electric insulation. The terminal rod 42 may be installed to penetrate through the center of the lower insulator 41, and a power supply line may be connected to an upper end of the terminal rod 42. Accordingly, the terminal rod 42 may be charged with a high voltage, and the tubular girder 48 may be grounded.

The second setting beams 15 are fixed to an upper surface of the tubular girder 48 such that lower ends thereof are fixed to the tubular girder 48 by means of welding or the like. The second setting beams 15 are arranged to extend in the same direction as the longitudinal direction of the tubular girder 48.

Figure 13:
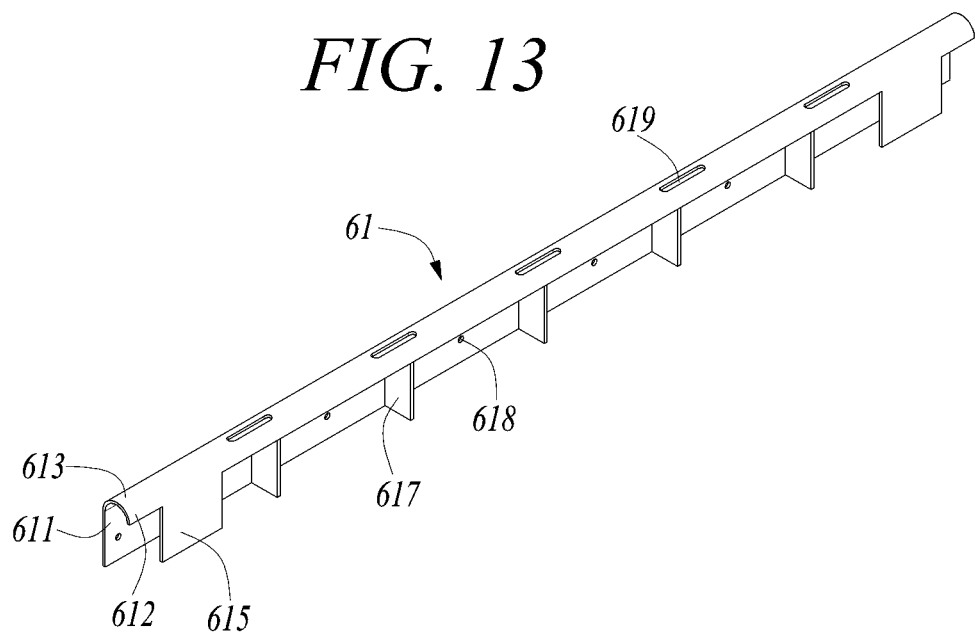
FIG. 13 is a perspective view illustrating an outer upper support of the electrostatic precipitating apparatus according to the first embodiment.
Figure 14:
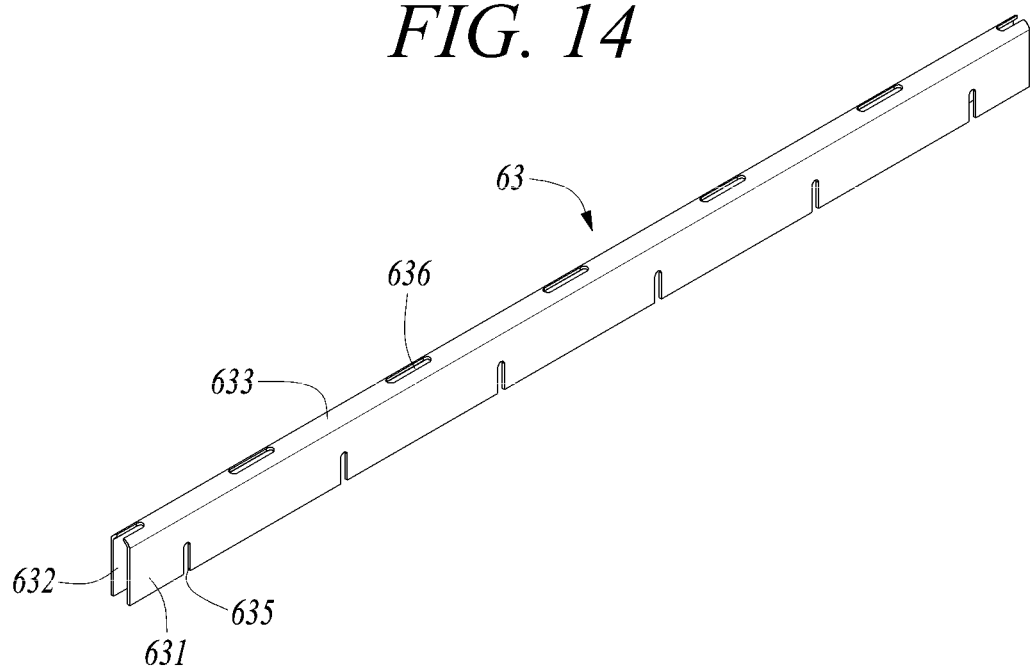
FIG. 14 is a perspective view illustrating a central upper support of the electrostatic precipitating apparatus according to the first embodiment.

FIG. 13 is a perspective view illustrating an outer upper support of the electrostatic precipitating apparatus according to the first embodiment, and FIG. 14 is a perspective view illustrating a central upper support of the electrostatic precipitating apparatus according to the first embodiment.

Referring to FIGS. 13 and 14, the outer upper supports 61 are disposed on the electrostatic precipitator 100 at both outer ends thereof, respectively. The central upper support 63 is disposed between the outer upper supports 61 at the central upper portion of the electrostatic precipitator 100.

A plurality of connectors, to which the first tie rods 16 are coupled, is provided to the outer upper supports 61 and the central upper support 63, wherein the connectors are screw-coupled to the first tie rods 16. The first tie rods 16 are connected such that one longitudinal end portion thereof is fixed to the outer upper support 61, and the other longitudinal end portion is fixed to the central upper support 63.

The outer upper support 61 includes a front plate 611 and a rear plate 612, which face each other, and a support plate 613 connecting the front plate 611 and the rear plate 612. The front plate 611 and the rear plate 612 may be formed from a flat plate, and the support plate 613 may be formed from a curved plate. The support plate 613 is provided with a plurality of holes 619 for discharging the washing water. In addition, the front plate 611 may be provided with holes 618 for the connectors.

The rear plate 612 has a height shorter than that of the front plate 611, and a coupling plate 615 protruding downward is formed at a portion where the prestressing locking member 70 is coupled to the rear plate 612. The coupling plates 615 are located at both longitudinal edges of the outer upper support 61.

In addition, the outer upper support 61 further includes reinforcing ribs 617, which are located between the front plate 611 and the rear plate 612 to abut against and support inner surfaces of the front plate 611 and the rear plate 612. The reinforcing ribs 617 are spaced apart in the longitudinal direction of the outer upper support 61.

On the other hand, the central upper support 63 includes two wall surfaces 631 and 632 extending downwards, and a curved support surface 633 connecting the wall surfaces 631 and 632. A plurality of grooves 635 into which the connectors 65 are inserted may be formed in the wall surfaces 631 and 632, and a plurality of holes 636 for discharging the washing water are formed in the support surface 633.

The prestressing locking member 70 is resiliently connected to the outer upper support 61. The prestressing locking member 70 is fixedly connected in a state of compressing the outer upper support 61 inwards to reduce vibration of the electrostatic precipitator 100.

Figure 15:
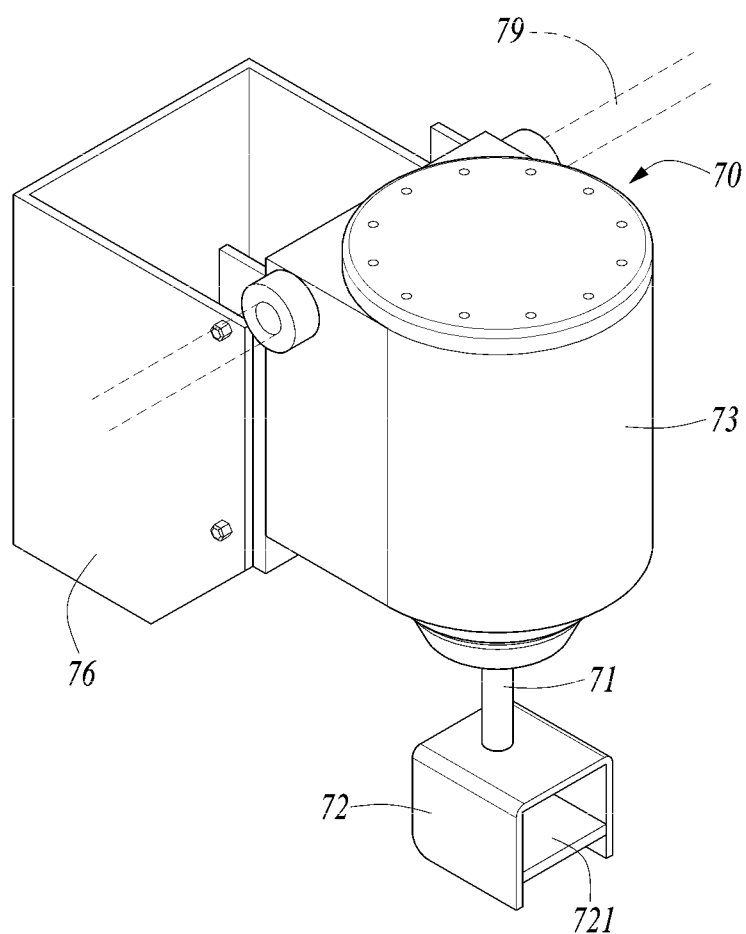
FIG. 15 is a perspective view illustrating a prestressing locking member of the electrostatic precipitating apparatus according to the first embodiment.
Figure 16:
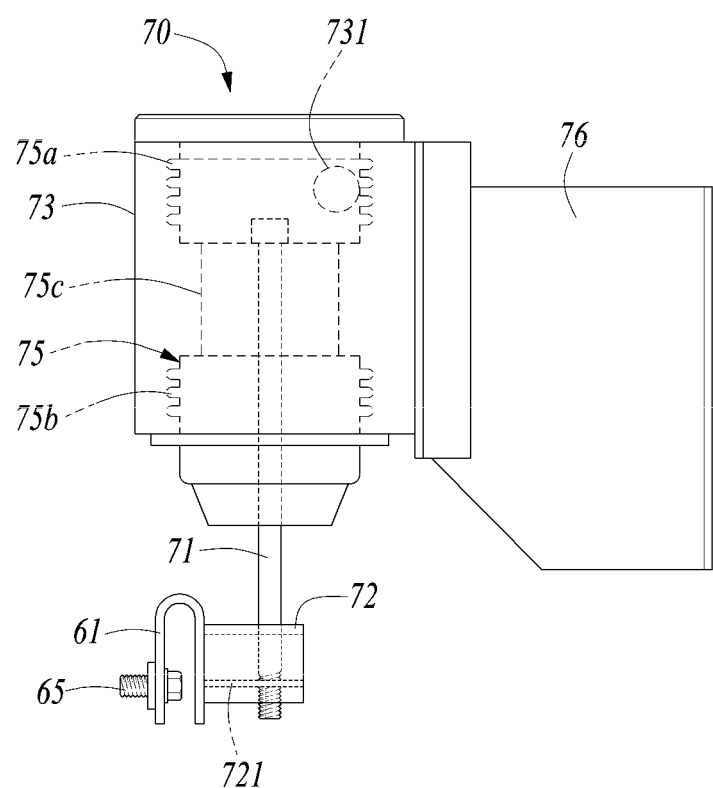
FIG. 16 is a side view illustrating the prestressing locking member of the electrostatic precipitating apparatus according to the first embodiment.

FIG. 15 is a perspective view illustrating the prestressing locking member 70 of the electrostatic precipitating apparatus according to the first embodiment, and FIG. 16 is a side view illustrating the prestressing locking member of the electrostatic precipitating apparatus according to the first embodiment.

Referring to FIGS. 15 and 16, the prestressing locking member 70 is fixed to the inner wall of the duct 1200. The prestressing locking member 70 includes a casing 73, an insulator 75 installed in the casing 73, a pressing rod 71 coupled to the insulator 75, and a pressing support 72 coupled to the pressing rod 71.

The casing 73 is formed in a cylindrical shape with an inner space, and a bracket 76 for fixing to the duct 1200 is fixed to one side of the casing 73. In addition, an air inlet 731 may be provided in the casing 73, and the purge air supply pipe 79 may be connected to the air inlet 731. The purge air introduced into the casing 73 is discharged to the bottom to prevent a short circuit due to moisture.

The insulator 75 includes an upper insulator part 75a fixed to the upper portion of the casing 73, a lower insulator part 75b fixed to the lower portion of the casing 73, and an insulating tube 75c connecting the upper insulator part 75a and the lower insulator part 75b. The pressing rod 71 is fixed to the insulator 75 so as to protrude below the prestressing locking member 70. The lower portion of the pressing rod 71 is formed with a thread for fastening with the pressing support 72.

The pressing support 72 is fixed to the lower portion of the pressing rod 71 and the pressing support 72 includes an inner support plate 721 for coupling with the pressing rod 71. The inner support plate 721 is screw-coupled with the pressing rod 71. The pressing support 72 contacts the outer upper support 61 to force the outer upper support 61 into the electrostatic precipitator 100.

As described above, when the outer upper support 61 is installed in a state of being pressurized by the prestressing locking member 70, the vibration of the electrostatic precipitator 100 can be efficiently reduced.

Hereinafter, an air conditioning system according to a second embodiment of the present disclosure will be described.

Figure 17:
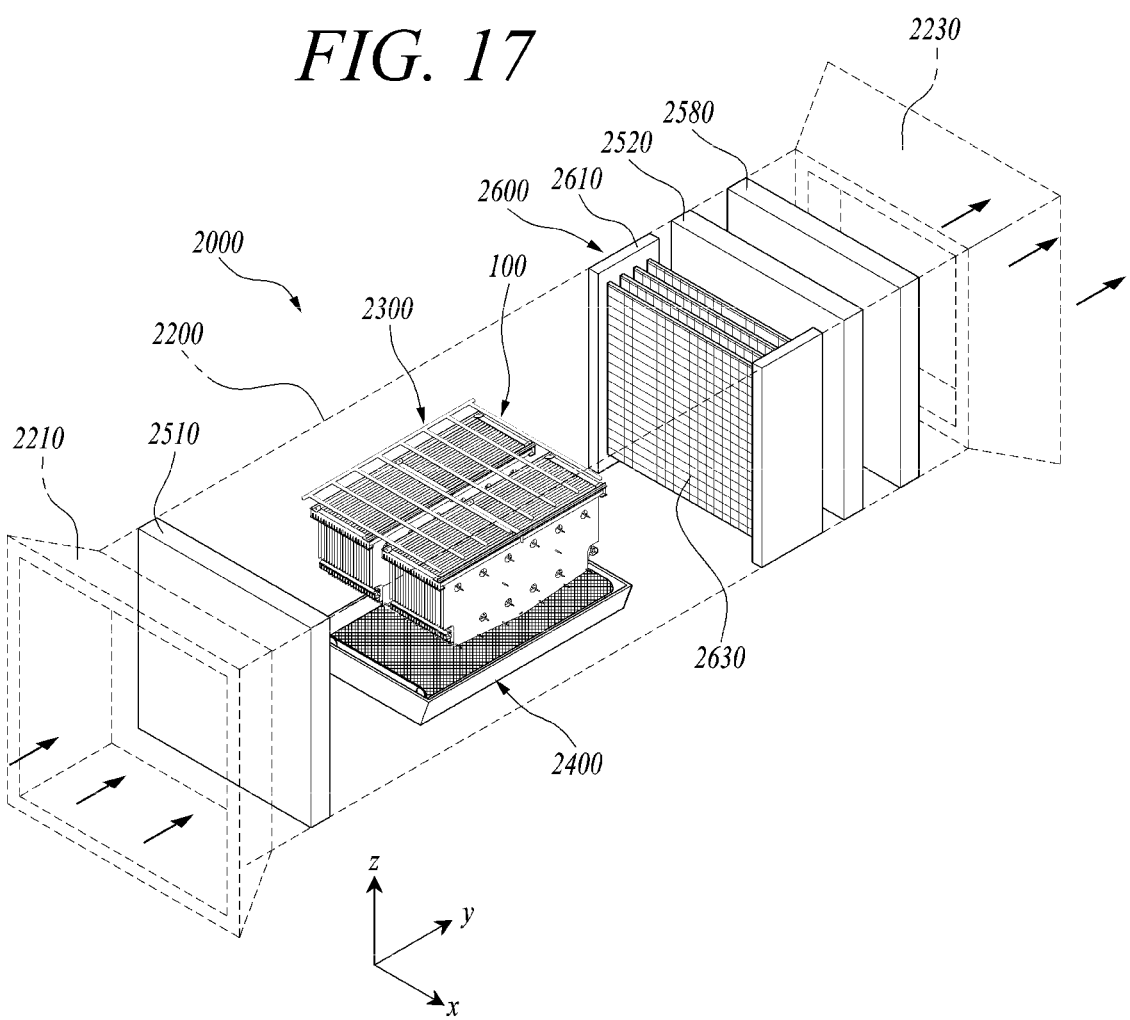
FIG. 17 is a perspective view illustrating an air conditioning system according to a second embodiment of the present disclosure.
Figure 18:
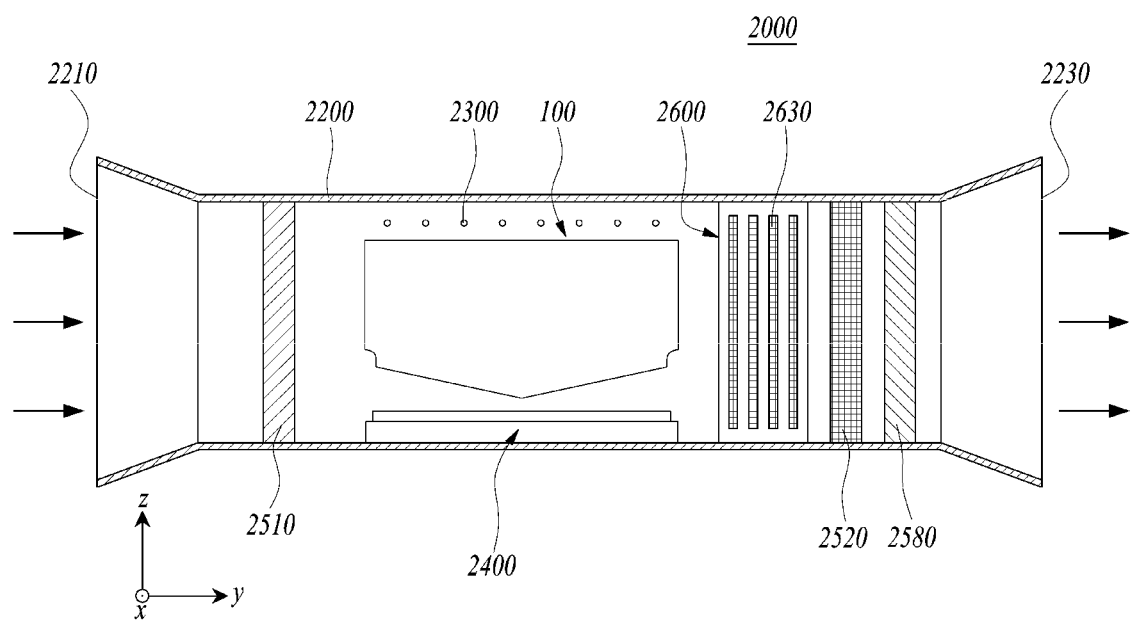
FIG. 18 is a longitudinal cross-sectional view illustrating the air conditioning system according to the second embodiment.
Figure 19:
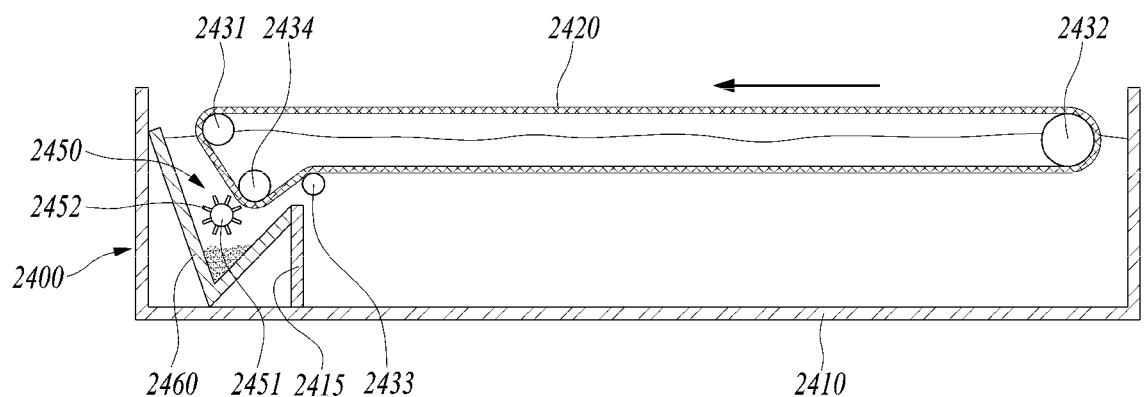
FIG. 19 is a cross-sectional view illustrating a treatment section for washing water installed in a lower part of an electrostatic precipitating apparatus of the air conditioning system according to the second embodiment.

FIG. 17 is a perspective view illustrating the air conditioning system according to the second embodiment of the present disclosure and FIG. 18 is a longitudinal cross-sectional view illustrating the air conditioning system according to the second embodiment.

Referring to FIGS. 17 and 18, the air conditioning system 2000 according to the second embodiment is an apparatus that introduces and heats/cools external air or indoor circulation air, and removes dust contained in the air.

The air conditioning system 2000 includes a duct 2200, a pre-filter 2510, a carbon filter 2520, an UV-ray treatment section 2600, a heat exchanger 2580, an electrostatic precipitator 100, a frame assembly, a washing water supply 2300, and a washing water treatment section 2400.

The duct 2200 is formed from a substantially rectangular tube, and a blower (not shown) may be installed on one side or both sides in the longitudinal direction of the duct 2200. An air inlet 2210 may be formed on one side of the duct 2200 and an air outlet 2230 may be formed on the other side of the duct 2200 in the longitudinal direction.

The pre-filter 2510 is a filter that collects large dust, such as suspended matter and the like, having a size of 150 μm or more. The pre-filter 2510 is installed in front of the electrostatic precipitator 100 with respect to the movement direction of air to absorb large dust to be introduced into the electrostatic precipitator 100. The pre-filter 2510 may include a nonwoven fabric and a known metal mesh disposed on opposite sides of the nonwoven fabric. However, the present disclosure is not limited thereto, and the pre-filter 2510 may be formed of various kinds of materials.

The UV-ray treatment section 2600 is disposed at the rear of the electrostatic precipitator 100 to remove ozone from the air having passed through the UV-ray treatment section 2600 and purify the air. The UV-ray treatment section 2600 includes an UV irradiator 2610 composed of a facial light source and a photocatalytic reactor 2630. Two of the UV irradiators 2610 having a plate shape are disposed on an inner wall of the duct 2200 to face each other. The photocatalytic reactor 2630 is installed between the UV irradiators 2610. The photocatalytic reactor 2630 is formed from a porous plate or a mesh body, and is coated with a photocatalyst mainly composed of titanium oxide. The photocatalytic reactor 2630 may be placed upright in a direction to cross air flow. In addition, the photocatalytic reactor 2630 may be disposed perpendicular to the UV irradiator 2610.

When a UV ray is irradiated from the UV-ray treatment section 2600, ozone in the air is converted into oxygen ions and oxygen radicals by UV rays to perform a bactericidal action. In addition, harmful bacteria may be sterilized directly by UV rays. In addition, the photocatalyst in the photocatalytic reactor generates hydroxide radicals having strong oxidizing power by UV rays, and the hydroxide radicals may react with various volatile organic compounds to decompose into water and carbon dioxide to remove contaminants.

The carbon filter 2520 is located at the rear of the UV-ray treatment section 2600 with respect to the traveling direction (x-axis direction) of air so as to not only adsorb odors from the air discharged from the electrostatic precipitator 100, but also remove ozone generated in the electrostatic precipitator 100. The carbon filter 2520 contains activated carbon having high adsorptivity. Activated carbon is a porous material that has a characteristic of adsorbing pigments and odors well. Therefore, the carbon filter 2520 physically adsorbs and removes various kinds of harmful gases and odors.

The heat exchanger 2580 may have a structure to be adapted to the air conditioning system to heat or cool air. While the heat exchanger 2580 may be disposed at the rear of the carbon filter 2520, the present disclosure is not limited thereto. For example, the heat exchanger 2580 may be disposed at the front of the pre-filter 2510 or between the electrostatic precipitator 100 and the carbon filter 2520.

The washing water treatment section 2400 serves to accommodate the washing water falling from the electrostatic precipitator 100 and solidify the dust contained in the washing water. The washing water treatment section 2400 includes a water reservoir 2410 for storing the washing water, an adsorption belt 2420 disposed above the water reservoir 2410, a roller moving the adsorption belt 2420, and a scraper 2450 removing the dust attached to the adsorption belt 2420. Here, the washing water may be water, or a sodium hydroxide solution. When the sodium hydroxide solution is used as the washing water, the washing power can be improved.

The water reservoir 2410 is disposed at the bottom of the duct and stores the washing water supplied through the washing water supply 2300. A refill line may be connected to the water reservoir 2410 to refill water, and a valve may be attached to the refill line.

The adsorption belt 2420 may be formed from a metallic or resinous mesh material having a plurality of holes. When the adsorption belt 2420 is formed from a mesh material, dust contained in the washing water is attached to the adsorption belt 2420 while falling to the water reservoir 2410 through the adsorption belt 2420.

That is, the adsorption belt 2420 may be formed from a metallic or synthetic resin mesh material having a warp-weft knitted net structure. In addition, a wire of the adsorption belt 2420 may be provided with a plurality of fine protrusions for the adsorption of dust. Herein, the fine protrusions refer to protrusions having a diameter smaller than 0.1 mm. Meanwhile, the adsorption belt 2420 may be formed from a metallic or synthetic resin plate having a plurality of holes formed therein. When the adsorption belt 2420 is formed from a mesh material, dust contained in the washing water is attached to the adsorption belt 2420 while falling to the water reservoir 2410 through the adsorption belt 2420.

The adsorption belt 2420 is formed in an endless track form by connecting the longitudinal ends together. The lower part of the adsorption belt 2420 is immersed in the washing water, and the upper part of the adsorption belt 2420 is located above the washing water so as to be exposed to the outside. During the movement, the lower surface of the adsorption belt 2420 adsorbs dust in the washing water contained in the water reservoir, and the upper surface of the adsorption belt 2420 adsorbs dust in the washing water falling thereto. The exposed portion of the adsorption belt 2420 adsorbs the dust and moves toward the scraper 2450.

The adsorption belt 2420 is provided with a plurality of rollers for supporting and moving the adsorption belt 2420. The rollers include two support rollers 2431 and 2432, which are disposed on both longitudinal sides of the adsorption belt, and first and second transition rollers 2433 and 2434, which are disposed between the two support rollers 2431 to bend the lower part of the adsorption belt 2420 upward and downward. The support rollers 2431 and 2432 abut against the inner surface of the adsorption belt 2420, the first transition roller 2433 abuts against the outer surface of the adsorption belt 2420, and the second transition roller 2434 abuts against the inner surface of the adsorption belt 2420.

The first transition roller 2433 supports the lower part of the adsorption belt 2420 to move upwards, and thus the lower part of the adsorption belt 2420 is formed to be inclined with respect to the ground such that a gap between the upper part and the lower part of the adsorption belt 2420 decreases from the support roller 2432 towards the first transition roller 2433. The second transition roller 2434 is disposed between the first transition roller 2433 and the support roller 2431 so as to support the lower part of the adsorption belt 2420 to be inclined upward.

The lower part of the adsorption belt 2420 is positioned below the upper end of a blocking wall 2415 by the second transition roller 2434. That is, the first transition roller 2433 supports the adsorption belt 2420 to move upwards than the upper end of the blocking wall 2415, thereby preventing the adsorption belt 2420 and the blocking wall 2415 from interfering with each other. The second transition roller 2434 allows the lower part of the adsorption belt 2420 to be positioned below the blocking wall 2415 so that the dust mass does not pass over the blocking wall 2415. On the other hand, the scraper 2450 is in contact with the adsorption belt 2420 between the second transition roller 2434 and the support roller 2431.

The blocking wall 2415 is installed in the water reservoir 2410 to separates the space where the scraper 2450 is located from the remaining space. Although the blocking wall 2415 may be located between the first transition roller 2433 and the second transition roller 2434, the present disclosure is not limited thereto. For example, the blocking wall 2415 may be disposed adjacent to the scraper 2450. The first transition roller 2433 may be positioned above the blocking wall 2415.

The scraper 2450 is installed in the water reservoir such that the scraper contacts the lower part of the adsorption belt 2420 to scrape off and remove the dust attached to the adsorption belt 2420. The scraper 2450 includes a rotary rod 2451 and a plurality of paddles 2452 protruding from the outer circumferential surface of the rotary rod 2451. The paddle 2452 is formed in a plate shape extending in the longitudinal direction of the rotary rod 2451, around which the paddles 2452 may be spaced apart from each other. The paddle 2452 may be formed of an elastic material, and serves to come into contact with the adsorption belt 2420 to scrape off the attached to the adsorption belt. A motor may be coupled to the rotary rod 2451 to rotate the same.

The dust mass separated by the scraper 2450 solidifies and accumulates at the bottom of the water reservoir 2410 so that the upper portion of the inside of the water reservoir 2410 is provided with relatively clean washing water. Since the dust mass is located in the space divided by the blocking wall 2415, washing water in the other space may be purified.

On the other hand, a separation container 2460 is disposed below the scraper 2450 to accommodate the dust mass. The separation container 2460 is located in the space separated by the blocking wall 2415 and may be formed to have a triangular end. Accordingly, the dust mass in the separation container 2460 is not easily separated from the separation container, and the washing water may be easily managed by periodically replacing the separation container.

The electrostatic precipitator 100 is disposed between the pre-filter 2510 and the UV-ray treatment section 2600. The washing water supply 2300 is positioned above the electrostatic precipitator 100. The washing water supply 2300 supplies the washing water to the electrostatic precipitator 100 to remove the dust attached to the electrostatic precipitating electrode. Since the electrostatic precipitator 100 and the frame assembly according to the second exemplary embodiment have the same structure as the electrostatic precipitator and the frame assembly according to the first exemplary embodiment, a repeated description thereof will be omitted.

Hereinafter, an air conditioning system according to a third embodiment of the present disclosure will be described.

Figure 20:
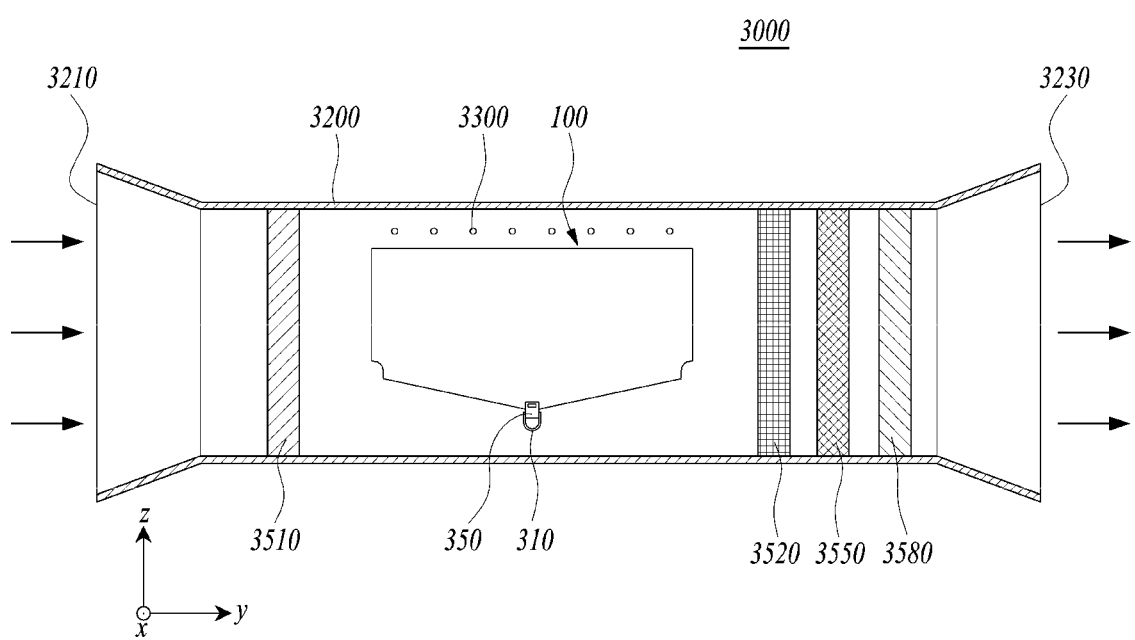
FIG. 20 is a longitudinal cross-sectional view illustrating an air conditioning system according to a third embodiment of the present disclosure.
Figure 21:
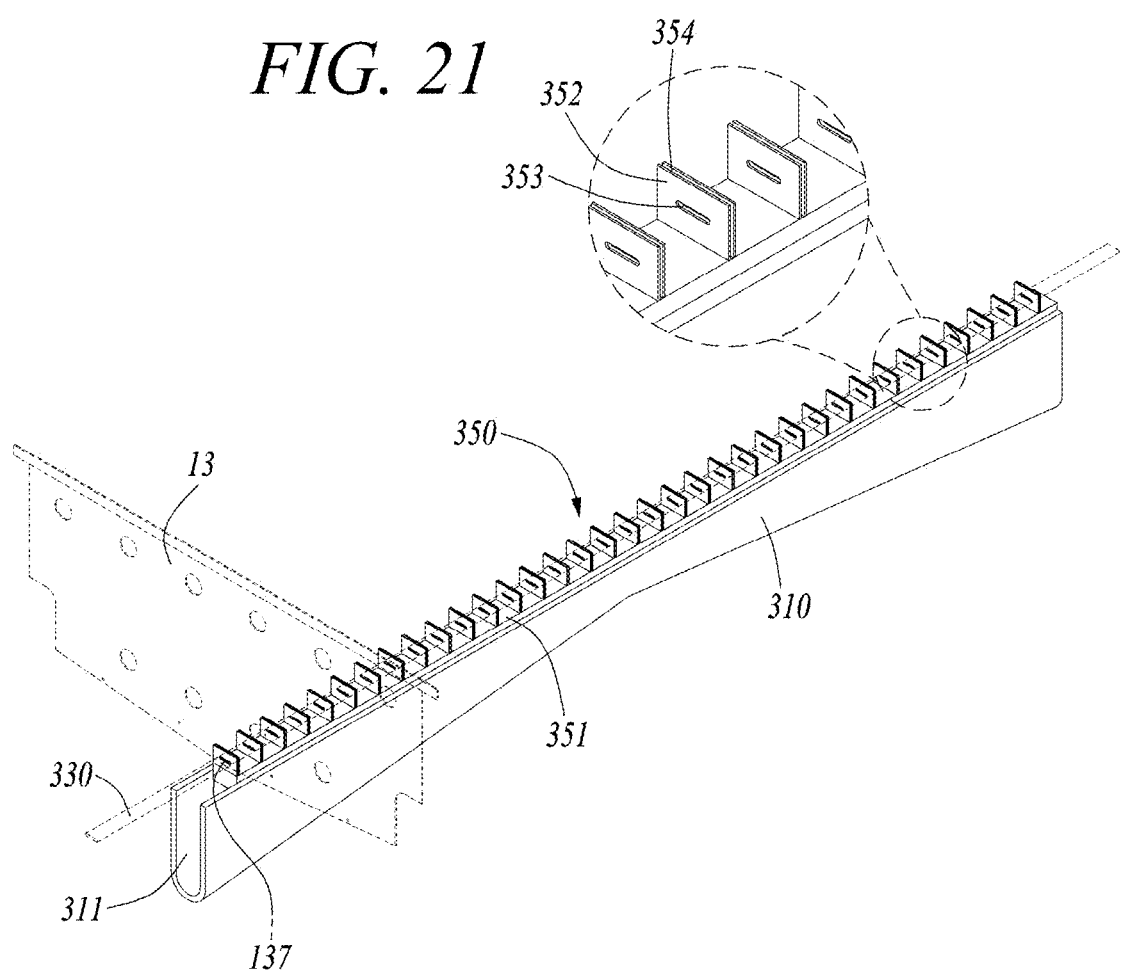
FIG. 21 is a perspective view illustrating a support hanger and a discharge guide of the air conditioning system according to the third embodiment.

FIG. 20 is a longitudinal cross-sectional view illustrating the air conditioning system according to the third embodiment of the present disclosure, and FIG. 21 is a perspective view illustrating a support hanger and a discharge guide of the air conditioning system according to the third embodiment.

Referring to FIGS. 20 and 21, the air conditioning system 3000 according to the third embodiment is an apparatus that introduces and heats/cools external air or indoor circulation air, and removes dust contained in the air.

The air conditioning system 3000 includes a duct 3200, a pre-filter 3510, a HEPA filter 3550, a carbon filter 3520, a heat exchanger 3580, the electrostatic precipitator 100, a frame assembly, and a washing water supply 3300.

The duct 3200 is formed from a substantially rectangular tube, and a blower (not shown) may be installed on one side or both sides in the longitudinal direction of the duct 3200. An air inlet 3210 may be formed on one side of the duct 3200 and an air outlet 3230 may be formed on the other side of the duct 3200 in the longitudinal direction.

The pre-filter 3510 is a filter that collects large dust, such as suspended matter and the like, having a size of 150 μm or more. The pre-filter 3510 is installed in front of the electrostatic precipitator 100 with respect to the movement direction of air to absorb large dust introduced into the electrostatic precipitator 100. The pre-filter 3510 may include a nonwoven fabric and a known metal mesh disposed on opposite sides of the nonwoven fabric. However, the present disclosure is not limited thereto, and the pre-filter 3510 may be formed of various kinds of materials.

The carbon filter 3520 is located at the rear of the electrostatic precipitator 100 with respect to the traveling direction (e.g., y-axis direction) of air so as to not only adsorb odors from the air discharged from the electrostatic precipitator 100, but also remove ozone generated in the electrostatic precipitator 100. The carbon filter 3520 contains activated carbon having high adsorptivity. Activated carbon is a porous material that has a characteristic of adsorbing pigments and odors well. Therefore, the carbon filter 3520 physically adsorbs and removes various kinds of harmful gases and odors.

The HEPA filter 3550 is disposed at the rear of the carbon filter 3520 to adsorb fine dust. The HEPA filter 3550 may have the same structure as a HEPA filter that is typically applied to air purification. The HEPA filter 3550 may include a pleated filter fiber and a frame. Although the HEPA filter has a problem of generating a large pressure drop, the HEPA filter has an effect of efficiently precipitating fine dust.

The heat exchanger 3580 may have a structure to be adapted to the air conditioning system to heat or cool air. While the heat exchanger 3580 may be disposed at the rear of the HEPA filter 3550, the present disclosure is not limited thereto. For example, the heat exchanger 3580 may be disposed at the front of the pre-filter 3510 or between the electrostatic precipitator 100 and the carbon filter 3520.

The electrostatic precipitator 100 is disposed between the pre-filter 3510 and the carbon filter 3520. The washing water supply 3300 is positioned above the electrostatic precipitator 100. The washing water supply 3300 supplies the washing water to the electrostatic precipitator 100 to remove the dust attached to the electrostatic precipitating electrode. Since the electrostatic precipitator 100 and the frame assembly according to the third exemplary embodiment have the same structure as the electrostatic precipitator and the frame assembly according to the first exemplary embodiment, a repeated description thereof will be omitted.

A support hanger 350 and a discharge guide 310 for collecting contaminated washing water discharged from the electrostatic precipitating electrode 13 are disposed at the lower portion of the electrostatic precipitator 100. The support hanger 350 is coupled to the discharge guide 310 to support the discharge guide 310. The electrostatic precipitating electrode 13 is provided with a central fixing hole 137, into which a fixing rod 330 extending in the stacking direction of the precipitating electrodes 13 is inserted and fitted. The fixing rod 330 is combined with the support hanger 350 to fix the support hanger 350 to the electrostatic precipitating electrodes 13.

The support hanger 350 has a lower support bar 351 extending in the stacking direction of the electrostatic precipitating electrodes 13 and fixed to the discharge guide 310, and connection protrusions 352 protruding upward from the lower support bar 351 so as to connect the lower ends of the precipitating electrodes 13. The connection protrusion 352 is provided with a connection groove 354 having a support hole 353 into which the fixing rod 330 is inserted.

The connection protrusion 352 may be composed of two plates spaced apart from each other by a gap constituting the connection groove 354. The connection protrusions 352 are spaced apart in the longitudinal direction of the lower support bar 351 such that the connection protrusions are respectively fixed to the lower ends of the precipitating electrodes 13. The support hole 353 and the fixing hole 137 are aligned together, so that the fixing rod 330 penetrates through the support hole 353 and the fixing hole 137. Accordingly, the support hanger 350 may be stably fixed to the lower ends of the electrostatic precipitating electrodes 13.

The discharge guide 310 is disposed at the center of the electrostatic precipitating electrode 13 in the width direction, and the width of the discharge guide 310 is smaller than the width of the electrostatic precipitating electrode 13. For example, the width of the discharge guide 310 may be $1/100$ to $1/10$ of the width of the electrostatic precipitating electrode 13.

The discharge guide 310 has an open upper portion and a channel 311 through which the washing water flows. The discharge guide 310 may be formed such that the bottom has a slope in which the height increases from the central portion thereof towards opposite sides thereof in the longitudinal direction.

Accordingly, the washing water introduced into the discharge guide 310 may flow to the opposite sides of the discharge guide 310. Discharge pipes (not shown) for discharging the washing water may be connected to the opposite sides of the discharge guide 310.

The electrostatic precipitating electrode 13 has a lower end that is inclined so that the center portion thereof protrudes downward. Accordingly, the washing water flowing along the surface of the electrostatic precipitating electrode 13 is finally collected toward the lowest portion at the central portion of the precipitating electrode 13. After concentrated at the lower central portion of the electrostatic precipitating electrode 13, the washing water may be introduced into the discharge guide 310 and then discharged to outside.

As described above, according to the third embodiment, the support hanger 350 and the discharge guide 310 are provided to the lower end of the electrostatic precipitating electrode 13 to stably discharge the washing water with minimal disruption of air flow and to prevent the washing water containing impurities from contaminating the cooling water as well.

Figure 22:
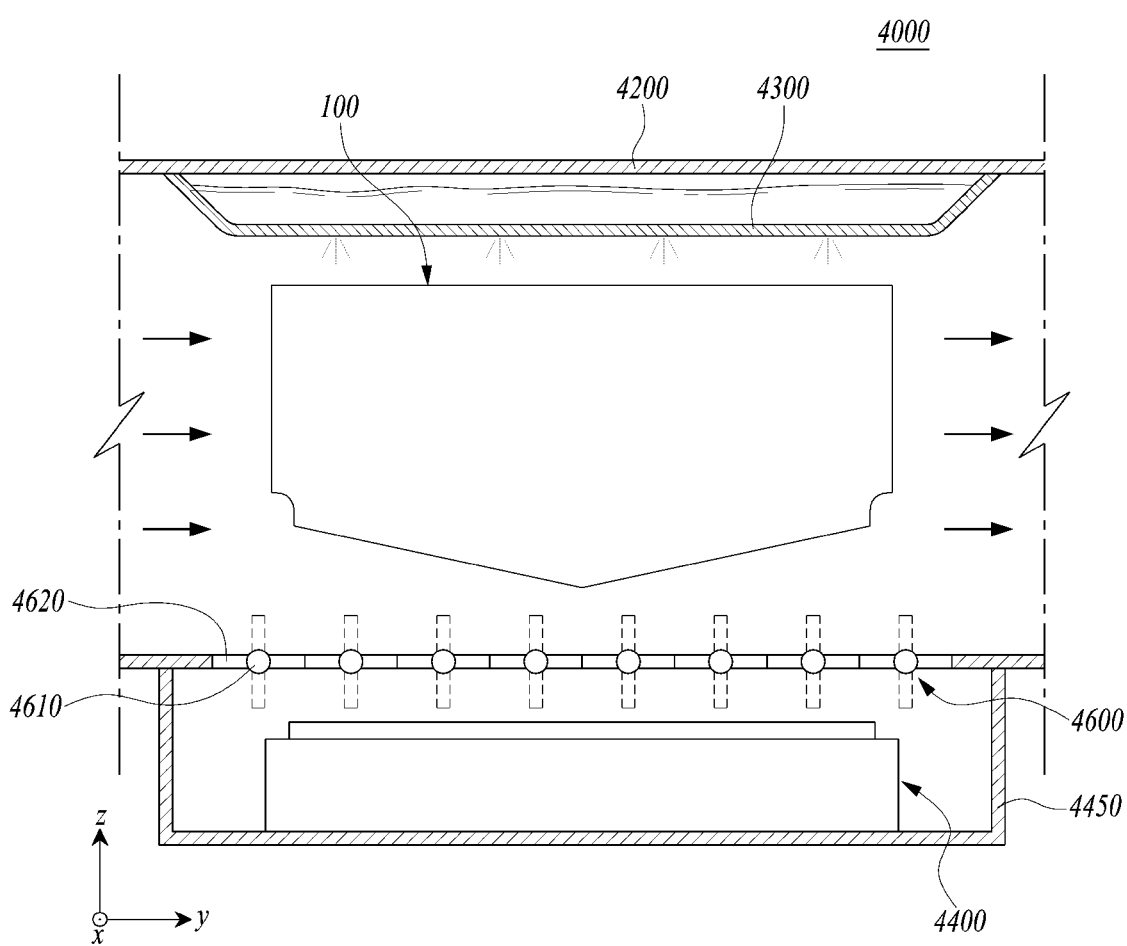
FIG. 22 is a partial longitudinal cross-sectional view illustrating an air conditioning system according to a fourth embodiment of the present disclosure.

Hereinafter, an air conditioning system according to a fourth embodiment of the present disclosure will be described. FIG. 22 is a partial longitudinal cross-sectional view illustrating the air conditioning system according to the fourth embodiment of the present disclosure.

Referring to FIG. 22, the air conditioning system 4000 according to the fourth exemplary embodiment has the same structure as that of the first embodiment as described above, except that a washing water supply 4300, a duct 4200, and a blocking member 4600 are installed, so a repeated description of the same configuration will be omitted.

The washing water supply 4300 may be disposed above the electrostatic precipitator 100. The washing water supply 4300 may be formed in the form of a water reservoir. A nozzle may be provided on a lower surface of the washing water supply 4300. Here, the nozzle may spray water at a predetermined cycle.

The duct 4200 is provided with a support container 4450 protruding downward, and a washing water treatment section 4400 is disposed in the support container 4450. In addition, the duct 4200 is provided with the blocking member 4600 for opening and closing the upper space of the washing water treatment section 4400.

The blocking member 4600 is disposed between the electrostatic precipitator 100 and the washing water treatment section 4400. The blocking member 4600 may be rotatably installed in the duct 4200, and may include a plurality of blocking plates 4620 and a plurality of rotary pillars 4610 connected to the widthwise centers of the blocking plates 4620. A driver may be installed on the rotary pillar 4610 to rotate the rotary pillar, so that the blocking member 4500 may be rotated about the rotary pillar 4610.

When the blocking plates 4620 are disposed horizontally with respect to the ground, the side ends of the blocking plates 4620 contact each other to separate the space where the electrostatic precipitator 100 is located from the space where the washing water treatment section 4400 is located. In addition, when the washing is performed, the blocking plates 4620 are erected perpendicular to the ground so that the washing water may easily flow from the electrostatic precipitator 100 to the washing water treatment section 4400.

When the blocking member 4600 is installed as in the fourth embodiment, the interference of the washing water treatment section 4400 with the air flow may be minimized.

Figure 23:
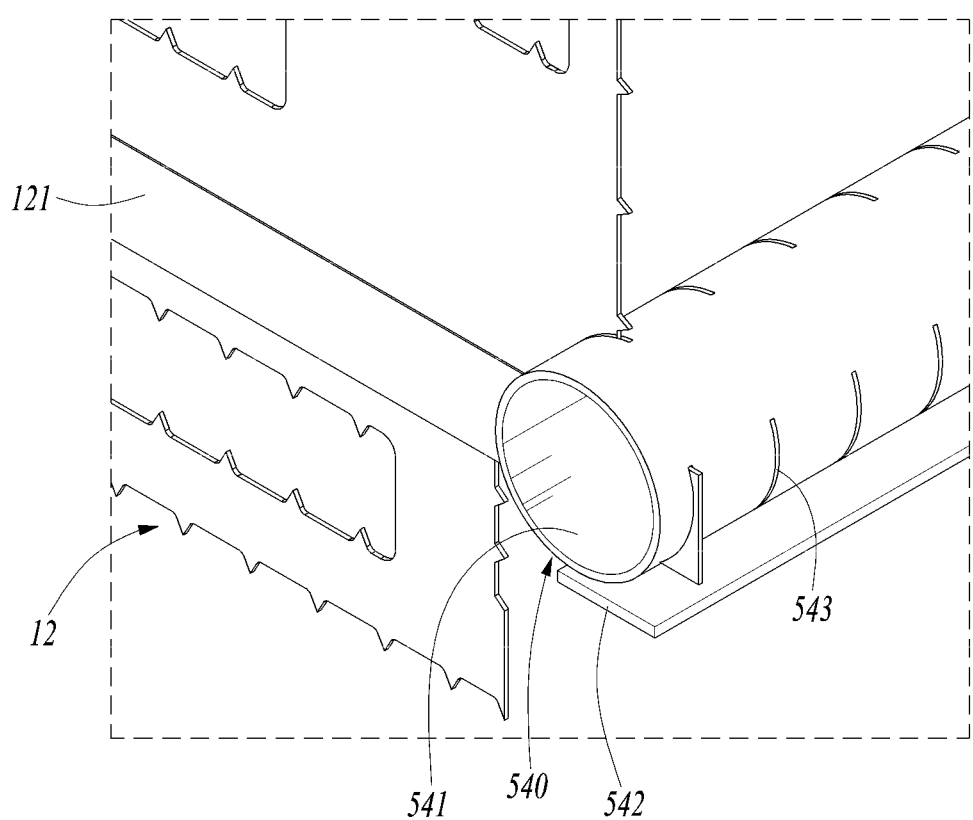
FIG. 23 is a partial perspective view illustrating a first setting beam and a discharge electrode of an electrostatic precipitating apparatus in an air conditioning system according to a fifth embodiment of the present disclosure.

Hereinafter, an electrostatic precipitator according to a fifth embodiment of the present disclosure will be described. FIG. 23 is a partial perspective view illustrating a first setting beam and a discharge electrode according to the fifth embodiment of the present disclosure.

Referring to FIG. 23, the electrostatic precipitator according to the fifth embodiment has the same structure as that of the air conditioning system according to the first embodiment except for a first setting beam, so a repeated description of the same constitution will be omitted.

The first setting beams 540 are formed to extend in the stacking direction of the discharge electrodes 12, and each have a plurality of lower slots 543 into which the side ends of the discharge electrodes 12 are inserted. A first reinforcing rod 121 is inserted into the first setting beam 540 such that the lower end of the first reinforcing rod 121 is supported by the first setting beam 540.

The first setting beam 540 includes a tubular support tube 541 having a circular cross section and a lower support plate 542 fixed to the lower end of the support tube 541. The plurality of lower slots 543 are formed in the support tube 541 and the side ends of the first reinforcing rod 121, and the discharge electrode 12 are inserted into the lower slots 543.

On the other hand, the lower support plate 542 is of a flat plate shape and is fixed to the lower end of the support tube 541. The lower support plate 542 abuts against the lower surface of the first reinforcement rod 121 to support the first reinforcement rod 121.

As described above, according to the fifth embodiment, the first setting beam 540 and the discharge electrode 12 can be more easily coupled.

Figure 24:
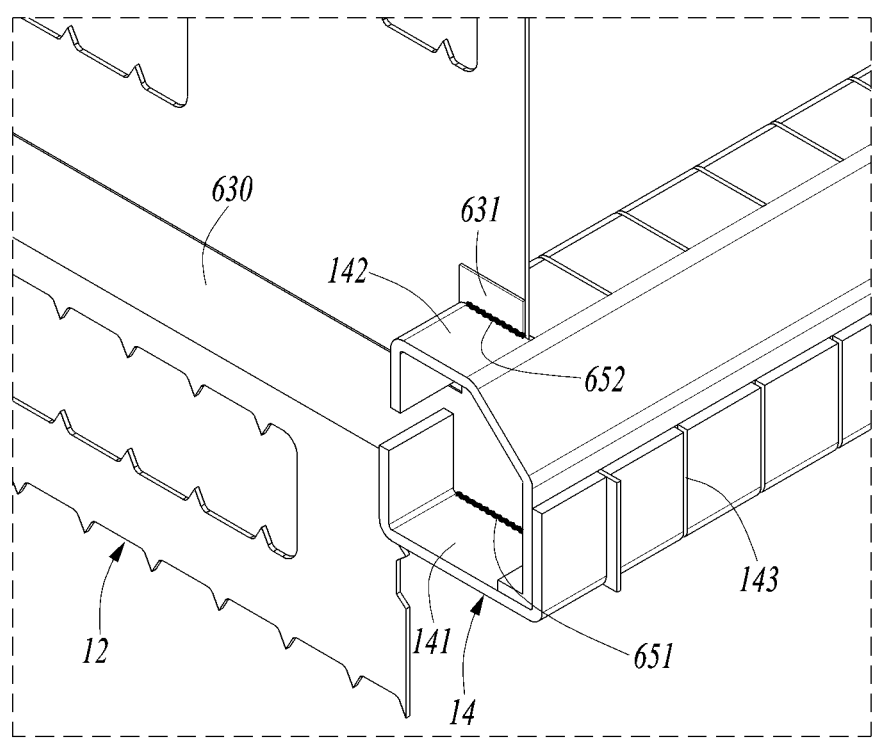
FIG. 24 is a partial perspective view illustrating a first setting beam and a discharge electrode of an electrostatic precipitating apparatus in an air conditioning system according to a sixth embodiment of the present disclosure.

Hereinafter, an electrostatic precipitator according to a sixth embodiment of the present disclosure will be described. FIG. 24 is a partially perspective view illustrating a first setting beam and a discharge electrode according to the sixth embodiment of the present disclosure.

Referring to FIG. 24, the electrostatic precipitator according to the sixth embodiment has the same structure as that of the electrostatic precipitator according to the first embodiment except for the structure of a first reinforcing rod 630, so a repeated description of the same structure will be omitted.

The discharge electrode 12 includes the first reinforcing rod 630 installed at a lower portion of the plate, where the first reinforcing rod 630 is coupled to the first setting beam 14 to support the discharge electrode 12. The first reinforcing rod 630 is formed to be longer than the width of the discharge electrode 12 so as to protrude from both side ends of the discharge electrode 12. The first reinforcing rod 630 may be joined to the first setting beam 14 by means of a first weld 651.

The first reinforcing rod 630 is formed with a support protrusion 631 protruding upward. The support protrusion 631 is installed to penetrate through the upper end of the first setting beam 14 and may be welded to the first setting beam 14. The support protrusion 631 is joined to the first setting beam 14 by means of a second weld 652.

The first setting beam 14 is formed to extend in the stacking direction of the discharge electrodes 12, and has the plurality of lower slots 143 into which the side ends of the discharge electrodes 12 are inserted. The first reinforcing rod 630 is installed in the first setting beam 14 so that the first reinforcing rod 630 passes through the first setting beam 14 and the lower end of the first reinforcing rod 630 is supported by the first setting beam 14.

The first setting beam 14 includes a lower beam 141 and an upper beam 142 coupled to the lower beam 141. The first weld 651 welds an extension of the first reinforcing rod 630, which extends in the longitudinal direction of the discharge electrode, and the lower beam 141 while the second weld 652 welds the support protrusion 631 and the upper beam 142.

As described above, according to the sixth embodiment, the support protrusion 631 is formed on the first reinforcement rod 630 and the first reinforcing rod 630 is connected to the first setting beam 14 by the first weld 651 and the second weld 652, so that the discharge electrode 12 can be more stably fixed.

While the exemplary embodiments of the present disclosure have been described in the detailed description, the present disclosure is not limited thereto, but should be construed as including all of modifications, equivalents, and substitutions falling within the spirit and scope of the invention defined by the appended claims.

The invention claimed is:
1. An electrostatic precipitating apparatus for an air conditioning system having a duct with a gas inlet and a gas outlet, the apparatus comprising:
 an electrostatic precipitator including a plurality of discharge electrodes to which a voltage is applied and a plurality of electrostatic precipitating electrodes each disposed between the plurality of discharge electrodes and grounded;
 a washing water supply disposed above the electrostatic precipitator, to spray washing water downward to the electrostatic precipitator; and a frame assembly fixed to the duct to support the electrostatic precipitator, the frame assembly including a prestressing locking member comprising a pressing rod, wherein the prestressing locking member is fixed to inside of the duct and is configured to press the frame assembly inwardly by the pressing rod pressing the frame assembly, wherein a downward end of electrostatic precipitating electrode is formed inclined downward from both sides of the each electrostatic precipitating electrode toward a center of the downward end of the each electrostatic precipitating electrode in a width direction of the each electrostatic precipitating electrode such that the each electrostatic precipitating electrode is provided with a downward end tip protruding downward at the center of the downward end of the each electrostatic precipitating electrode.

2. The electrostatic precipitating apparatus according to claim 1, wherein the prestressing locking member includes a casing, an insulator disposed in the casing, the pressing rod coupled to the insulator to protrude downward, and a pressing support fixedly coupled to the pressing rod to resiliently support the electrostatic precipitator.

3. An electrostatic precipitating apparatus for an air conditioning system having a duct with a gas inlet and a gas outlet, the apparatus comprising:

an electrostatic precipitator including a plurality of discharge electrodes to which a voltage is applied and a plurality of electrostatic precipitating electrodes each disposed between the discharge electrodes and grounded;

a washing water supply to spray the washing water to the electrostatic precipitator; and a frame assembly fixed to the duct to support the electrostatic precipitator, the frame assembly including a prestressing locking member fixed to inside of the duct in a state in which a pressing force is applied to the electrostatic precipitator, wherein the electrostatic precipitator includes a plurality of first tie rods fixed to the plurality of discharge electrodes to pass through the plurality of electrostatic precipitating electrodes, and a plurality of second tie rods fixed to the plurality of electrostatic precipitating electrodes to pass through the plurality of discharge electrodes, wherein the frame assembly further includes a plurality of upper supports to which some of the first tie rods are fixed, and wherein the prestressing locking member is fixedly provided to press the upper support inward.

4. An electrostatic precipitating apparatus for an air conditioning system having a duct with a gas inlet and a gas outlet, the apparatus comprising:

an electrostatic precipitator including a plurality of discharge electrodes to which a voltage is applied and a plurality of electrostatic precipitating electrodes each disposed between the discharge electrodes and grounded;

a washing water supply to spray the washing water to the electrostatic precipitator; and a frame assembly fixed to the duct to support the electrostatic precipitator, the frame assembly including a prestressing locking member fixed to inside of the duct in a state in which a pressing force is applied to the electrostatic precipitator, further comprising a washing water treatment section disposed under the electrostatic precipitator to accommodate the washing water falling from the electrostatic precipitator, the washing water treatment section comprising:

a water reservoir containing the washing water;

an adsorption belt formed in an endless track and accommodated in the water reservoir; and a roller connected to the adsorption belt to move the adsorption belt.

5. The electrostatic precipitating apparatus according to claim 4, wherein the adsorption belt is formed from a mesh material.

6. The electrostatic precipitating apparatus according to claim 4, wherein one side of the adsorption belt is immersed in the washing water, and another side of the adsorption belt is located above the washing water.

7. The electrostatic precipitating apparatus according to claim 4, wherein the washing water treatment section further comprises a scraper configured to scrape off dust attached to the adsorption belt and separate the dust from the adsorption belt.

8. The electrostatic precipitating apparatus according to claim 7, wherein the scraper comprises a support part installed upright from the bottom of the water reservoir, and an elastic tip part protruding upward from the support part.

9. The electrostatic precipitating apparatus according to claim 7, wherein the scraper comprises a rotatable rotary rod and a plurality of paddles circumferentially spaced apart from each other to protrude from an outer circumferential surface of the rotary rod.

10. The electrostatic precipitating apparatus according to claim 7, wherein a separation container is disposed in a space defined by a blocking member below the scraper.

11. The electrostatic precipitating apparatus according to claim 1, wherein a discharge guide having a channel is disposed directly below the downward end tip, the discharge guide extending in a stacking direction of the plurality of electrostatic precipitating electrodes.

12. The electrostatic precipitating apparatus according to claim 11, wherein a part of each electrostatic precipitating electrode is provided with a fixing hole, through which a fixing rod is inserted, wherein a support hanger is coupled to the fixing rod to support the discharge guide.

13. The electrostatic precipitating apparatus according to claim 12, wherein the support hanger comprises a support bar extending in the stacking direction of the plurality of electrostatic precipitating electrodes fixed to the discharge guide, and a plurality of connection protrusions protruding upward from the support bar and into which the part of each electrostatic precipitating electrode is inserted, wherein each connection protrusion is provided with a support hole into which the fixing rod is inserted.

* * * * *